(12) United States Patent
Foust

(10) Patent No.: US 11,361,514 B2
(45) Date of Patent: Jun. 14, 2022

(54) DYNAMIC SURFACES FOR VIRTUAL REALITY APPLICATIONS

(71) Applicant: Scott Everitt Foust, Salt Lake City, UT (US)

(72) Inventor: Scott Everitt Foust, Salt Lake City, UT (US)

(*) Notice: Subject to any disclaimer, the term of this patent is extended or adjusted under 35 U.S.C. 154(b) by 0 days.

(21) Appl. No.: 16/873,939

(22) Filed: Aug. 14, 2020

(65) Prior Publication Data

US 2021/0035366 A1 Feb. 4, 2021

Related U.S. Application Data

(63) Continuation of application No. 15/337,948, filed on Oct. 28, 2016, now abandoned.

(60) Provisional application No. 62/249,728, filed on Nov. 2, 2015.

(51) Int. Cl.
*G06T 19/00* (2011.01)
*G06F 3/01* (2006.01)
*G06T 7/20* (2017.01)
*G06T 17/10* (2006.01)
*G06T 19/20* (2011.01)

(52) U.S. Cl.
CPC ............ *G06T 19/006* (2013.01); *G06F 3/011* (2013.01); *G06F 3/016* (2013.01); *G06T 7/20* (2013.01); *G06T 17/10* (2013.01); *G06T 19/20* (2013.01); *G06T 2200/04* (2013.01); *G06T 2215/16* (2013.01)

(58) Field of Classification Search
CPC ......... G06T 19/006; G06T 7/20; G06T 17/10; G06T 19/20; G06T 2200/04; G06T 2215/16; G06F 3/011; G06F 3/016
See application file for complete search history.

(56) References Cited

U.S. PATENT DOCUMENTS

| 6,109,922 A | * | 8/2000 | Litschel | G09B 21/004 340/4.12 |
| 8,573,979 B2 | * | 11/2013 | Skinner | G09B 21/003 434/114 |
| 9,874,007 B2 | * | 1/2018 | Malitskiy | E04B 1/34305 |
| 2011/0127113 A1 | * | 6/2011 | Vanderburgh | E04F 11/1041 187/200 |

(Continued)

OTHER PUBLICATIONS

Leithinger, D. and Ishii, H. Relief: A Scalable Actuated Shape Display. TEI'10, (2010), 221-222. (Year: 2010).*

(Continued)

*Primary Examiner* — Grace Q Li

(57) ABSTRACT

Methods, systems, and devices for dynamic structure and surface environment are described. A columnar structure that may include a tiled surface may be used to create or adjust a surface of physical structure to allow for dynamic columns to provide an augmented physical environment. In some examples, a first plurality of columns may be configured to adjust in a first direction from a first position to a second position, an actuator in contact with some of the columns may be configured to cause the columns to adjust in the first direction from the first position to the second position; and a controller configured to receive information associated with position information of some of the columns and may communicate with the actuator.

16 Claims, 21 Drawing Sheets

(56) References Cited

U.S. PATENT DOCUMENTS

2016/0127664 A1\* 5/2016 Bruder ................. G01S 5/163
 463/30

OTHER PUBLICATIONS

Blackshaw, M., DeVincenzi, A., Lakatos, D., Leithinger, D., and Ishii, H. Recompose: Direct and Gestural Interaction with an Actuated Surface, in CHIEA '11: ACM. (Year: 2011).\*

D. Leithinger, et al. Physical telepresence: Shape capture and display for embodied, computer-mediated remote collaboration. Proceedings of the 27th annual ACM symposium on User Interface Software and Technology (Association of Computing Machinery, New York, 2014), pp. 461-470. (Year: 2014).\*

\* cited by examiner

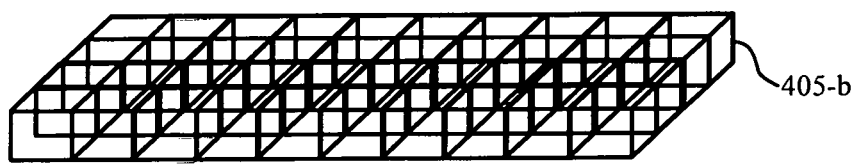

DYNAMIC SURFACES FOR VIRTUAL REALITY APPLICATIONS

CROSS REFERENCE

The present Application for Patent is a continuation of U.S. patent application Ser. No. 15/337,948 by Foust, entitled "Dynamic Surfaces for Virtual Reality Applications," filed Oct. 28, 2016, which claims priority to U.S. Provisional Patent Application No. 62/249,728 by Foust, entitled "DYNAMIC TESSELLATED SURFACE WITH INDIVIDUALLY OSCILLATING TILES FOR VIRTUAL REALITY APPLICATIONS," filed Nov. 2, 2015, each of which is hereby incorporated by reference in its entirety.

BACKGROUND

The following relates generally to dynamic structures and surfaces for virtual reality applications, and more specifically to columns that adjust to augment virtual reality and may include one or more tessellated surfaces.

Virtual reality continues to progress with the advances in electronic and computing technology, including motion sensing and devices that allow for greater user mobility. Some virtual reality applications, however, do not provide a dynamic immersive experience.

SUMMARY

The described techniques relate to improved methods, systems, devices, or apparatuses that support dynamic structures and surfaces for virtual reality applications.

In virtual reality applications, a virtual environment may be simulated within a computer processor/memory hardware. Multiple users may participate in the virtual environment through a computer network (e.g., a local area network (LAN) or a wide area network (WWAN)). Users of the virtual reality applications may then select a virtual representation (i.e., an avatar) to represent them in the virtual environment. A virtual representation, i.e., an avatar, may be a three-dimensional (3D) representation of the user or, in some cases, an object. Additionally, users of the virtual reality application may transmit commands to a virtual environment controller (i.e., server) which may control the virtual environment. As a result, the user's virtual representation may move and interact with the virtual environment. However, current virtual reality applications fail to dynamically adapt a physical environment of the user based on the virtual reality applications and virtual reality environments. The described techniques herein relate to configuring elements (i.e., structures, surfaces) in a physical environment such that a user of the virtual reality application may experience characteristics of the virtual environment, in the physical environment.

A method of adjusting an environment is described. The method may include identifying a first location of a user in a structure at a first time; identifying a position of each of a plurality of columns, each column having a length in a first direction, a cross-sectional area in a second direction, and a top surface; and adjusting a position of a subset of the plurality of columns based at least in part on the first location of the user and the position of the subset of the plurality of columns.

Some examples of the method described above may further include processes, features, means, or instructions for determining to adjust the position of at least one column based at least in part on the location of the user and the position of a subset of the plurality of columns, wherein adjusting the position of the subset of the plurality of columns may be based at least in part on the determination.

Some examples of the method described above may further include processes, features, means, or instructions for receiving sensor data detected from within the structure, wherein identifying the location of a user may be based at least in part on the sensor data. In some examples of the method described above, the sensor data comprises data associated with a sensor in contact with a column of the plurality of columns, or data associated with a sensor isolated from the plurality of columns, or a combination thereof. In some examples of the method described above, the sensor data comprises video data, audio data, Global Positioning System (GPS) data, heat data, pressure data, or a combination thereof.

Some examples of the method described above may further include processes, features, means, or instructions for identifying a second location of the user at a second time after the first time, wherein adjusting the position of the at least one column may be based at least in part on the first position and the second position. Some examples of the method described above may further include processes, features, means, or instructions for determining a parameter associated with the user based at least in part on the first position and the second position, the parameter comprising a speed, a direction, a velocity, an acceleration, or a combination thereof. In some examples of the method described above, the adjusting the position of the subset of the plurality of columns may be based at least in part on the determination.

Some examples of the method described above for adjusting the position of the subset of the plurality of columns may further include processes, features, means, or instructions for adjusting a first column to a first height in the first direction; and adjusting a second column to a second height different from the first height in the first direction. In some examples of the method described above, the adjusting the first column overlaps with adjusting the second column.

Some examples of the method described above may further include processes, features, means, or instructions for identifying an action of the user relative to a column of the subset of the plurality of columns based at least in part on the location of the user or sensor data, wherein adjusting the position of the column of the subset of the plurality of columns may be based at least in part on the identification.

In one example, a columnar apparatus for an environment may include a first plurality of columns having a length in a first direction, a first cross sectional area, a first subset of the first plurality of columns configured to extend/adjust in the first direction from a first position to a second position; an actuator in contact with at least some of the first plurality of columns, the actuator configured to cause the columns to extend/adjust in the first direction from the first position to the second position; and a controller configured to receive information associated with position information of the first subset of the first plurality of columns and communicate with the actuator.

Some examples of the columnar apparatus for an environment as described above may also include a second plurality of columns extending in the first direction, wherein a second subset of the second plurality of columns may be positioned below the first plurality of columns and may be configured to extend/adjust the first subset of the first plurality of columns in the first direction based at least in part on extending/adjusting in the first direction.

In some examples of the columnar apparatus for an environment described above, the first subset of the first plurality of columns may be configured to oscillate.

In some examples of the columnar apparatus for an environment described above, a second cross sectional area of the second subset of the second plurality of columns may be greater than the first cross sectional area of a column in the first plurality of columns.

In some examples of the columnar apparatus for an environment described above, a first column of the first plurality of columns comprises a first tile on a first end. Some examples of the columnar apparatus for an environment described above a second column of the first plurality of columns comprises a second tile surface on a first end; and a characteristic of the first tile may be different from a characteristic of the second tile.

In some examples of the columnar apparatus for an environment described above, the characteristic comprises: an orientation, a shape, a texture, a position relative to the first direction, or a combination thereof.

In some examples of the columnar apparatus for an environment described above, the controller may be configured to determine whether to communicate with the actuator based at least in part on received position information associated with the user.

In some examples of the columnar apparatus for an environment described above, the information associated with position information comprises: virtual reality environment information, wherein the controller may be configured to determine whether to communicate an instruction to the actuator to adjust the first set of columns based at least in part on the virtual reality environment information.

DETAILED DESCRIPTION

Figure 1:
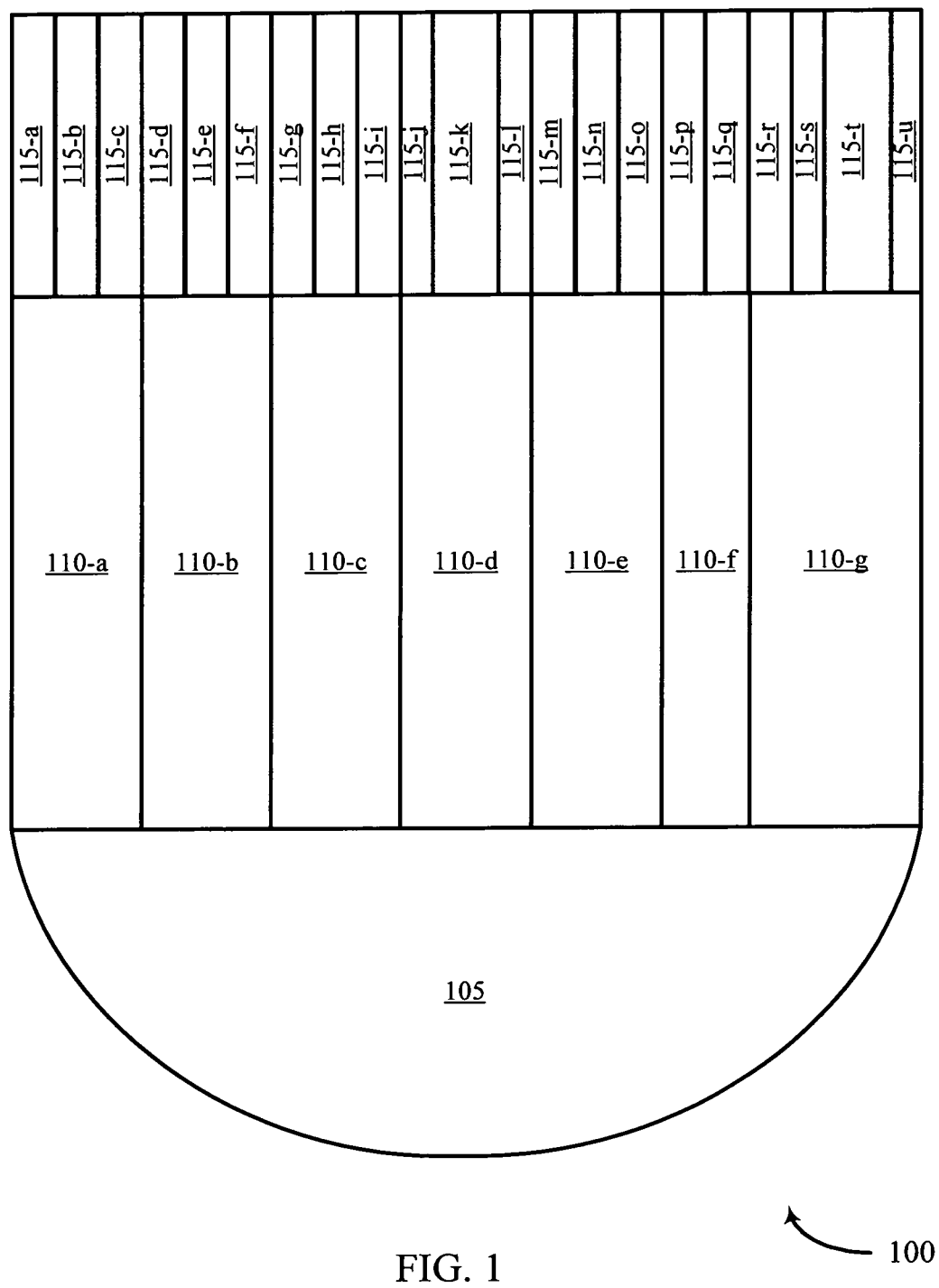
FIG. 1 illustrates examples of a dynamic structure and surface system in accordance with aspects of the present disclosure.

In virtual reality applications, a virtual environment may be simulated within a computer processor/memory hardware. Multiple users may participate in the virtual environment through a computer network (e.g., a local area network (LAN) or a wide area network (WWAN)). Users of the virtual reality applications may then select a virtual representation (i.e., an avatar) to represent them in the virtual environment. A virtual representation, i.e., an avatar, may be a three-dimensional (3D) representation of the user or, in some cases, an object. Additionally, users of the virtual reality application may transmit commands to a virtual environment controller (i.e., server) which may control the virtual environment. As a result, the user's virtual representation may move and interact with the virtual environment. However, current virtual reality applications fail to dynamically adapt a physical environment of the user based on the virtual reality applications and virtual reality environments. Virtual reality is a rapidly growing technology sector that has attracted significant attention from some of the most prominent companies in the technology industry. As a result, consumer interest has spiked for virtual reality products. Virtual reality products such as the virtual reality headset hardware may become smaller, lighter, wireless, and may include additional capabilities. Continued progress in computer vision will lead to better and more detailed real-time people and object tracking in three-dimensional space. Some consumer virtual reality implementations are targeted for a seated experience or do not allow for a fully-immersive, tactile experience. In some cases, a room may be modeled and users may walk around a room. The problem of dynamically adjusting a virtual environment and physical interaction with such a virtual environment has yet to be sufficiently and successfully addressed. The described techniques herein relate to configuring elements (i.e., structures, surfaces) in a physical environment such that a user of the virtual reality application may experience characteristics of the virtual environment, in the physical environment.

One aspect of the present disclosure relates to the use of adjustable oscillating structures (e.g., columns) to create programmably-shaped physical environments, rooms, walls, and topography. Another aspect of the present disclosure relates to transmitting or conveying physical sensations to the user (e.g., using vibration).

A physical environment may include an enclosed area, such as a warehouse, in which the floor may be made up of tiles (e.g., square, circular, or triangular tile) each of which may be actually the top face of a rigid column. In one case, each column of a plurality of columns may move independently and be powered by their own actuator (e.g., a linear motor). Alternatively, in some examples, a set of columns may be grouped and move simultaneously. Additionally, the set of columns may be powered by a single actuator or may be powered by individual actuators assigned to each column of the set. In some examples, various positional configurations can create areas of different shapes and surface topographies. For example, one configuration of surface topographies may represent a smooth and/or flat surface. Alternatively, another configuration of surface topographies may represent a rough, uneven, and/or sloped surface. In some examples, a surface topography may include a combination of smooth and rough surfaces of varying slopes. Alternatively, terraced slopes representing stairs or a seated amphitheater may be represented.

In some cases, each column may be subject to oscillation. For example, each column may be equipped with an oscillation device that may apply a vibration signal to the each column based on signals received from a source device (e.g., actuator, linear motor). In another example, the source device (e.g., actuator, linear motor) itself could act as the direct oscillator. As a result, an oscillation of each of these columns may transmit vibrations of various frequencies to people and objects in contact with the column. For example, a virtual environment may depict an occurrence of an earthquake in the virtual environment to the user via the virtual reality application. As a result, a group of oscillating columns in the physical environment may oscillate and map an experience level of the earthquake in the virtual environment to the user in the physical environment. In some aspects of the present disclosure, one or more users may share an experience of a virtual reality environment and the physical environment. For example, with reference to the above example, two users may be located within a same physical environment and experience a similar experience level related to the earthquake in the virtual environment via the physical environment. Alternatively, two users may be located in different physical environments and experience a similar level related to the earthquake in the virtual environment via their corresponding physical environment.

Other examples of virtual reality experiences do not facilitate a socially interactive experience in sharing virtual reality environments together, whether physically present in the same space, or at separate sites that can be programmed to be physically similar or identical so the user can essentially "share" the same virtual space. The present disclosure relates to a potentially-dynamic environment that may be controllable, programmable, and reactive to interaction.

Aspects of the disclosure are initially described in the context of dynamic columnar structures and surfaces. Aspects of the disclosure are further illustrated by and described with reference to apparatus diagrams, system diagrams, and flowcharts that relate to operations for dynamic setup and adjustment of columnar structures and surfaces. The description herein is provided to enable a person skilled in the art to make or use the disclosure.

Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein. Although certain examples are provided (e.g., constructions, numbers of components, layers, materials, environment parameters), other examples are specifically contemplated and will be readily apparent to those skilled in the art.

FIG. 1 illustrates an example of a dynamic structure and surface system 100 in accordance with various aspects of the present disclosure. The dynamic structures and surface system 100 includes a foundation layer 105, support columns 110 (e.g., support columns 110-*a* to 110-*g*), and columns 115 (e.g., column 115-*a* to 115-*u*). In some cases, dynamic structures and surface system 100 may support adjustment of various structures to augment a physical reality environment with or separate from a virtual reality environment. In some examples, the dynamic structure and surface system 100 may simulate the physical properties of objects and textures. In some examples, this may be based on the shape of the objects (e.g., the columns). Certain structures may be used in conjunction with virtual reality applications or simulations.

In some examples, a user may be able to "see" a virtual reality environment and that environment may be augmented with physical objects that add additional realism. For example, one or more images may be created (e.g., projected, based on virtual reality headwear, other options) in an environment. At the same time the physical objects and structures may be adjusted (e.g., columns or other structures may create objects that may allow for interaction. In some cases, the physical, structural adjustment may be used to help augment the virtual objects by allowing the user to have a dynamically-adjustable object to interact with and that would confirm the user's perception of the virtual reality environment. In other examples, some objects could be present in the physical environment or space, but may be rendered all or partially translucent or transparent in the virtual space. This would essentially create a force field effect by having one or more objects (e.g., walls, rocks, domes, obstacles) that the user would interact with, in some cases.

In some examples, the columns (and/or other similar structures), may be configured to move only in the vertical direction. Alternatively, the columns (and/or other similar structures), may be configured to move in multiple directions. For example, the columns may be configured to move in the vertical direction and may be able to rotate. In other examples, the columns (and/or other similar structures), may be configured to move vertically and horizontally (e.g., in an x direction) based on lateral movement, which may allow for multiple degrees-of-freedom. In other examples, the columns (and/or other similar structures), may be configured to move vertically and horizontally (e.g., in an x direction and a y-direction) based on lateral movement, which may allow for multiple degrees-of-freedom. This lateral movement may be based on using columns or other structures on rollers, such as a gimbal system or a platform that can move in one or more directions. In some examples, at least a subset of columns may be configure to rotate within a predetermined range about one or more axes.

In some cases, various movement capabilities may be combined with more traditional forms of motion simulation. The underlying anchoring structure may, in some cases, be gimbaled, allowing for global lateral motion on the x-y axis (environmental motion), tilt (lateral gravity effects on occupants) rotational force, other effects, and/or some combination.

Lower levels of columns beneath the primary interaction level, as described with reference to FIGS. 1 and 2, may be employed to increase the vertical topographical range of the landscape, and to create gravitational effects by accelerating groups of primary level columns during one or more periods. Upper levels of columns that may in some cases be smaller than those in other levels or layers, may be overlaid on the surface of one or more lower levels of columns for textural effects. Having multiple levels of columns may rely on similar principles of oscillation and adjustment. In some examples, columns 115 may be used for human scale features and surfaces such as chairs, boulders, tree stumps, walls, etc. Lower levels may be configured for human scale or larger scale. In some examples, at least some, if not all column levels, may be capable of vibrational wave propagation alone and/or in concert, to create sound waves and tactile transmissions.

Figure 2:
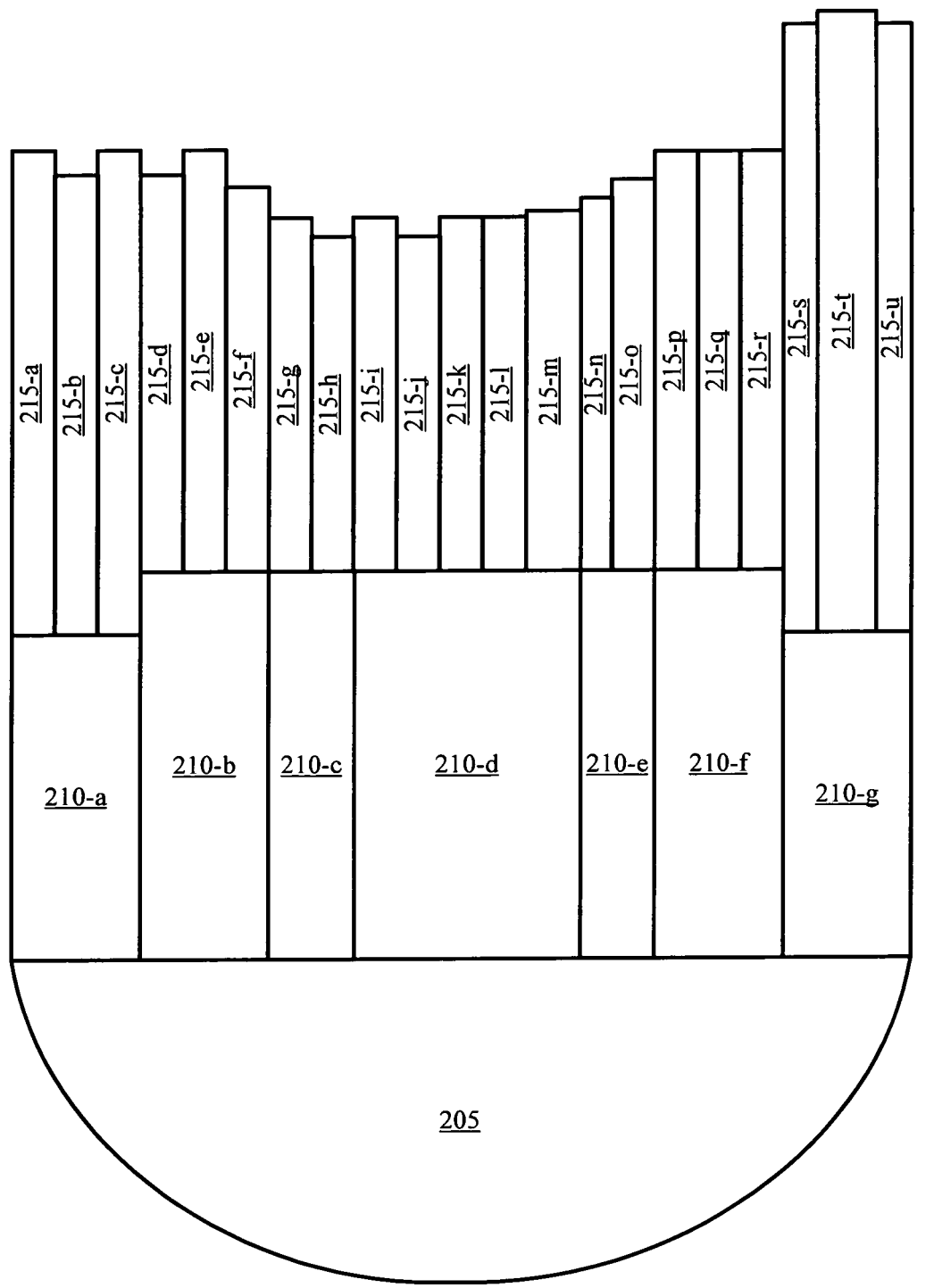
FIG. 2 illustrates an example of a dynamic structure and surface system in accordance with aspects of the present disclosure.

FIG. 2 illustrates an example of a dynamic structure and surface system 200 in accordance with various aspects of the present disclosure. The dynamic structure and surface system 200 includes a foundation layer 205, support columns 210 (e.g., support columns 210-*a* to 210-*g*), and columns 215 (e.g., column 215-*a* to 215-*u*), which may be examples of the corresponding device, structures, or surfaces described with reference to FIG. 1 and/or other figures. In some cases, dynamic structure and surface system 200 may support adjustment of various structures to augment a physical reality environment with or separate from a virtual reality environment.

In some examples, dynamic structure and surface system 200 may dynamically adapt or configure support columns 210 and columns 215 to produce an experience level related to continual lateral motion in the same or nearly the same direction. Alternatively, dynamic structure and surface system 200 may dynamically adapt or configure support columns 210, or columns 215, or foundation layer 205, or a combination thereof to produce an experience level related to continual motion in the same or nearly the same lateral direction. For example, dynamic structure and surface system 200 may be of a predetermined size and/or area to produce an illusion of continual motion in a direction (e.g., a lateral direction) that correlates to a human sensory perception for detecting linear motion.

Dynamic structure and surface system 200, in some cases, may apply subtle visual cues or distortions based on manipulation of known perceptive and cognitive illusions associated with human sensory perception. For example, dynamic structure and surface system 200 may dynamically adapt or configure support columns 210 and columns 215 to scale an experience level (e.g., movement perception, texture perception). For example, dynamic structure and surface system 200 may configure a physical environment by adjusting one or more of columns 215, or support columns 210, or combination thereof.

Additionally, dynamic structure and surface system 200 may increase an experience level based on manipulating individual columns (e.g., columns 215 or support columns 210) at increasingly smaller diameters creating the illusion of movement and/or texture through combinations of oscillation frequency and column spatial granularity. For example, dynamic structure and surface system 200 may adjust a diameter of one or more columns 215. In addition, dynamic structure and surface system 200 may oscillate one or more of the columns 215 via the foundation layer 205. In some cases, when spatial and temporal resolution of oscillators move below the spatial resolution and temporal response of the sensory organ in contact with the dynamic surface (the fingertips and lips being particular exemplars of high concentration of spatial nerve resolution) than any texture can be represented.

In some examples, one or more configurations of dynamic structure and surface system 200 may be based on a default mode. A default mode for dynamic structure and surface system 200 may match a 1:1 between the physical environment and a virtual representation. Alternatively, other modes exist where slightly different or time-delayed dynamic effects may be applied for creatively exploiting the human perceptual system. For example, in some cases the physical environment including objects, columns, and/or structures may be a scaled version of the virtual reality environment. Some examples of dynamic structure and surface system 200 may adjust objects, columns, or structures, or a combination thereof based on one or more modes of operation. For example, in one mode of operation the physical columns and/or dynamic objects, of dynamic structure and surface system 200, may be a scaled version of objects depicted in the virtual reality environment. In some examples, a third mode may be a "ground" state that may simulate various raised surface types based on adjusting one or more columns. The surface could itself change, perhaps flip from a default "ground" texture that may be firm (e.g., a hard texture) to several other textures (e.g., soft, squishy, bouncy).

Alternatively, in some cases, one or more elements of the physical environment may be smaller than or larger than the corresponding or related virtual reality environment elements. This may allow for physical interaction with some objects that provide the realism and augmentation of the virtual reality without requiring a one-to-one mapping of every element. For example, a wall may be formed by one or more columns that extend to approximately six feet high (e.g., columns 215-*s*, 215-*t*, 215-*u*), which may in some examples be a limit of the columnar extension. The wall in the virtual reality application, however, may be depicted or experienced by the user as appearing one hundred feet high.

In some cases, dynamic structure and surface system 200 may determine whether physical objects are different, the same, bigger, or smaller than the corresponding objects in the virtual reality environment based on one or more factors. As some examples, these factors may include user characteristics (e.g., height, weight), user interaction with one or more physical and/or virtual objects, physical environment characteristics (e.g., environment area, height, length, materials), other information, or some combination.

Figure 3A:
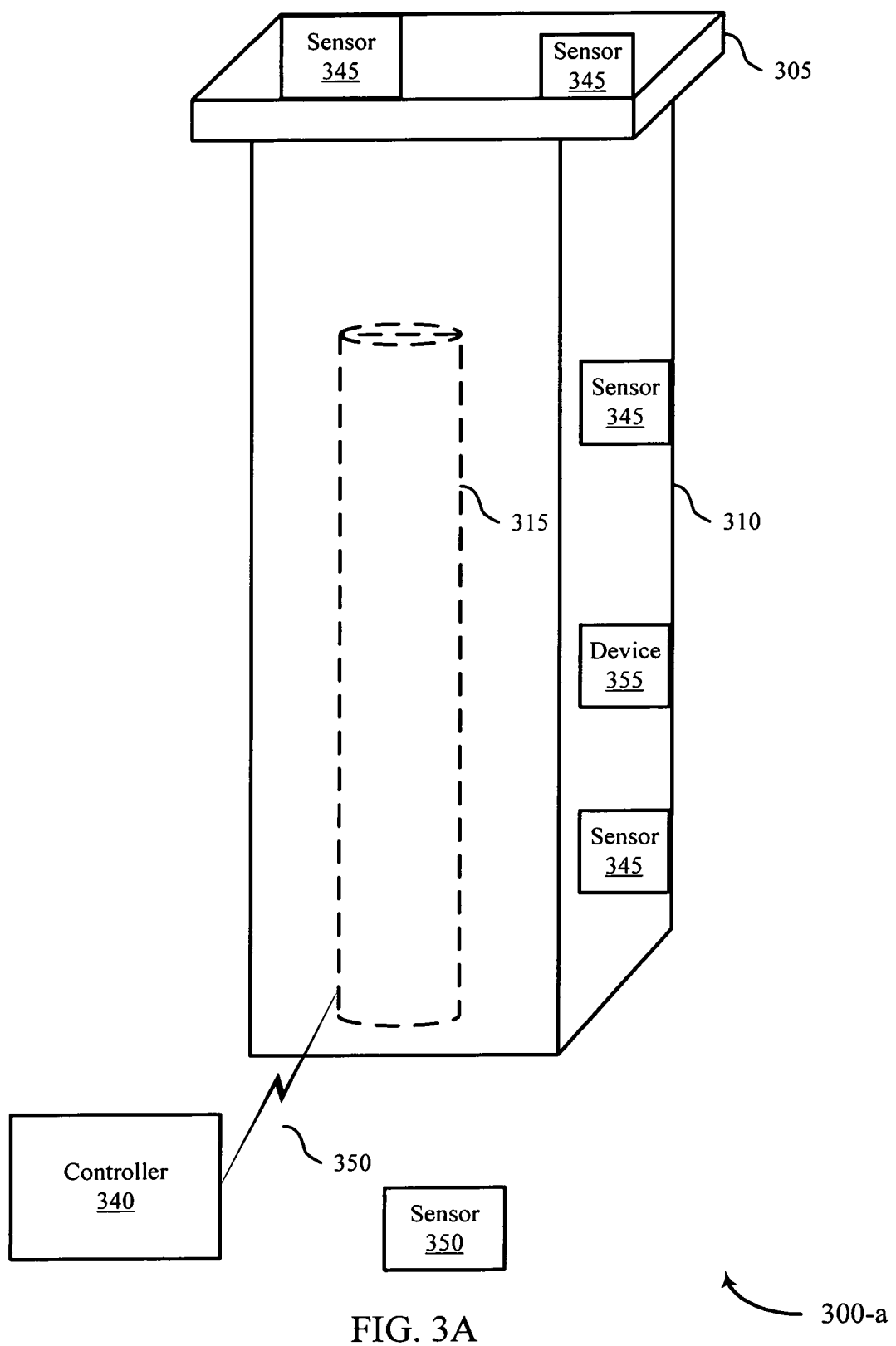
FIGS. 3A and 3B illustrate examples of a dynamic column and tile structure in accordance with aspects of the present disclosure.

FIG. 3A illustrates an example of a dynamic column and tile structure 300-*a* in accordance with various aspects of the present disclosure. The dynamic column and tile structure 300-*a* may include tile 305, column 310, actuator 315, among other components and/or elements. In some examples, actuator 315 may be in contact with, coupled to, connected to, or otherwise joined with tile 305, column 310, or both. Actuator 315 may, in some examples, be configured to communicate with and/or receive signals from one or more other devices and actuate one or more columns (e.g., column 310), one or more tiles (e.g., tile 305), other components, or a combination thereof. In some examples, actuator 315 may be fully surrounded by column 310, at least partially surrounded by column 310, or may be independent of column 310. In some examples, column 310 may be or include a unitary structure. In some cases, this structure may have a constant (or approximately constant cross-sectional area and/or geometry) and/or may be made from a single materials. In other examples, this structure may have a varying (or approximately varying cross-sectional area and/or geometry) and/or may be made from one or more components and/or materials.

In some cases, a column 310 may be or include a circular cross-section, an n-sided prism, another geometric shape, or a combination thereof. In some examples, a column 310 may include a tile component (e.g., a columnar or prismatic tile). For example, column 310 may be a rigid column that may be an elongated n-sided prism where n may be the shape of the polygon of the tile, or a circular column (cylinder) may be used. In some examples, column 310 may be made of a rigid material made of metal, ceramic, plastic, carbon composite, other materials, or a combination thereof, or other material with the necessary hardness and strength characteristics. In some examples, different columns may have or include different shapes, characteristics, functions, or features. In some cases, columns may be configured in various hierarchies of lengths and/or diameters, depending on which layer the columns reside in within an environment. In some examples, columns of different layers (e.g., such as those shown in FIGS. 1 and 2, among others), may have the same characteristics, similar characteristics, different characteristics, or a combination thereof. For example, these characteristics may include length, width, height, cross sectional area, cross-sectional shape, material, coating, components, other characteristics, or a combination thereof.

In some examples, column 310 may include a sensor 345. This sensor 345 may be embedded within or positioned at or on the surface of the column 310, perhaps in a substrate (e.g., a plastic substrate, a rubber substrate) that also serves to protect the end of the column and its interaction with a human or object. In some examples, this surface sensor may be or include a pressure sensor, a proximity sensor, another sensor, other sensor, or a combination thereof. This sensor may be included to detect a user's movement, type of movement (e.g., jumping, walking, running, sitting) and/or position (e.g., by activating the sensor by being on the sensor or by being proximate the sensor). In some cases, this detection may be based on multiple sensors and then correlating the data of these one or more sensors to identify or determine various conditions. Sensor 345 or other sensor 350 may be configured to transmit (e.g., through one or more wired and/or wireless communication links) received information, identifications, and/or determinations to one or more other devices (e.g., actuator 315, controller 340, a user device 1150). This information may be used by at least some of the one or more other devices to adjust column 310, other components, make identifications, determinations, or a combination thereof. In some examples, it may not be necessary to include a surface sensor, depending on the ability and sensitivity of the linear motor, or external sensor, to detect and transmit externally applied force information. In some cases, a surface sensor may be used alternatively to or additionally with one or more other sensors that may detect user location, action, etc.

In some examples, column 310 may include a tile 305 (e.g., an end cap) at the environment-interacting surface of the column. Tile 305 may be designed of plastic or rubber material which may also serve to protect the end of column 310 and its interaction with a human or object. In some examples, tile 305 may be or include a surface that may protect a part of column 310 and/or the user based on the user interacting with tile 305 and/or column 310. In some cases, tile 305 may include reversible surfaces (e.g., manually or automatically reversible based on a flipping motion). The reversible surface may each have different textures and/or characteristics to enable various uses of the tiles for different applications.

For example, a first surface may have a first texture or characteristic (e.g., a grass texture, a protruding texture, a finger-like texture), a second surface may have a second texture or characteristic (e.g., a smooth surface, a cobblestone surface, a rock surface, a second elasticity), a third surface may have a third texture or characteristic (e.g., a cement texture, a rough texture, a third elasticity), other textures or characteristics, or a combination thereof. Tile 305 may, additionally or alternatively, be configured to expose or alternate between various surfaces based on interaction with one or more actuators. In some cases, this may include rotating tile 305 around an axis to display a second side (e.g., like a second side of a coin).

Additionally, tile 305 may have a degree of freedom related to a movement on an axis of tile 305. For example, tile 305 may independently be adjusted on its axis to configure with one or more neighboring tiles. In some examples, one or more tiles (e.g., tile 305) may be adjusted directionally. In some cases, tile 305 may be coupled or connected to its own actuator (e.g., actuator 305) that may adjust a direction, angle, tilt of tile 305. In some examples, actuator 315 may be or include an electrically-powered physical device that controls the mechanical oscillation, movement, or adjustment of column 310. In some examples, actuator 315 may be entirely electrically powered or may include a hydraulically powered or air powered actuator, among other various types. Actuator 315 may be configured to adjust column 310 and/or column subcomponents to facilitate creation of an interactive, augmented reality environment. In some examples, actuator 315 may be or include a linear actuator that may be or include one or more linear motors, rotational motors, a rack and pinion constructions, other constructions, or a combination thereof.

In some cases, actuator 315 may be in contact with, coupled to, or connected with one or more components of one or more columns (e.g., columns 215 or support columns 210) and, based on receiving a signal or other information from another device (e.g., a controller, a user device), may adjust one or more aspects relating to one or more of the columns or sub-components. An electrically powered linear motor provides one example actuator for some applications, however other systems using pneumatic or hydraulic power are conceivable. In some cases, different actuators may be used for different layers or sets of columns (e.g., a linear actuator for first top column layer, a hydraulic actuator for a second column layer). In other examples, a similar type or model of actuator may be used for different layers or sets of columns for lower layers, depending on the area and weight requirements of the vertical force to overcome.

In some examples, tile 305 may include a positional sensor and an inertial sensor. In some cases, a sensor(s) (e.g., sensor 345 or sensor 350) may be perhaps embedded within a column for redundancy in position and velocity tracking. In some examples, sensor 345 may be configured to identify a column's absolute and/or relative position, acceleration, speed, other inertial-related parameters, other characteristics, or a combination thereof. In some cases, sensor 350 may be positioned relative to a column 310 (or columns). In some examples, sensor 350 may be a sensor external to or not in contact with column 310 (or other columns). For example, an external sensor may be positioned beneath actuator 315 and/or column 310 to provide an additional redundancy on detecting position and velocity tracking of each column. In some cases, sensor(s) 345 or 350 may be or include a laser. It may not be necessary to include such an additional sensor, depending on the ability and sensitivity of the linear motor, or possible internal sensor(s), to detect and transmit position and velocity information.

Additional potential components (e.g., sensor 345, device 355, or other devices) in or on tile 305 and/or column 310 could provide enhanced tracking capabilities for users and objects in the room (passive tracking, active tracking, or both). In some examples, LED, retroreflective, or other suitable markers could be embedded in or attached to one or more locations (e.g., one or more vertices, one or more edges, one or more faces) of tile 305 and/or column 310. These markers would facilitate easier and potentially more precise "inside-out" tracking from a VR headset mounted with cameras and/or other elements to more accurately determine headset position and orientation relative to one or more tiles 305 and/or columns 310, among other components. In some examples, lasers, or other form of electromagnetic radiation, may be or attached to one or more locations (e.g., one or more vertices, one or more edges, one or more faces) of tile 305 and/or column 310 to augment positional tracking of users and objects within the space. In some examples, device 355 may be or include one or more cameras, sensors, microphones, or other detectors embedded in or attached to one or more locations (e.g., one or more vertices, one or more edges, one or more faces) of tile 305 and/or column 310) to enhance computer vision tracking of bodies, objects, hands, and/or gestures, among other parameters.

Tile 305 may, additionally or alternatively, be positioned adjacent to each other along an axis or plane (e.g., x-y plane), but may be free to move in another axis or plane (e.g., the z axis). At the surface facing the desired action, tile 305 or endcap potentially containing a surface sensor 345 may be attached that will be continuous with the tile and approximately the same shape as the tile. In some examples, tile 305 may include rounded edges for comfort and safety. In some examples, column 310 may, in some cases, be individually manipulated in a direction (e.g., the z-axis) by actuator 315 (e.g., a mechanical oscillator). Additional devices for tracking columnar position in real time may be incorporated (e.g., a positional sensor, an inertial sensor, an external sensor such as a laser). In some examples, tile 305 will have the same cross-sectional area as column 310, in order to increase the utility of partially extended columns and avoiding overhangs or ledges between tile 305 and column 310. In other examples, tile 305 will have a different cross-sectional area from column 310.

Column 310 may, additionally or alternatively, include a tile or tiles on a distal end. In some cases, this may create floor made entirely up of tiles. Alternatively, a solid floor with a few simple shapes embedded (based on one or more columns) may be included, as discussed with reference to FIGS. 4A-4F. Each tile or simple shape making up the initially apparently 2-D surface may be the top face of a rigid column. In some cases, column 310 may be computer-controlled at remotely by a linear actuator, using control principles currently applied to display technologies (such as LED panels). In this way, each tile (e.g., tile 305) can be thought of as analogous to a pixel, and when multiplied by column protrusion in another direction (e.g., the z-axis), a voxel.

In some examples, column 310 may include or may be solid metal or ceramics or similar strength and rigidity for smaller diameter columns (e.g., sub-centimeter scale), with composite and/or partially hollow column structures for larger columns (e.g., 1 cm to 1 m or even greater diameter) in accordance with the inertial resistance of column 310. Reaction time and ability to efficiently move an appropriately strong and rigid object with the right or appropriate latency may be identified based on user experience, feedback, etc. In some examples, one or more columns (e.g., for larger scales) may include carbon fiber composites, or aluminum, or both for some applications.

In some examples, safety features may be included as part of a system (e.g., dynamic structure and surface system 100 or 200 as described with reference to FIG. 1 or 2). For example, sensors (i.e., sensor 345) may be incorporated into a surface of each tile that can precisely detect an amount of applied pressure (e.g., to millisecond accuracy or other timing constraints, based on weight, based on acceleration), primarily to obtain awareness of human interaction. The rigid columns may be surfaced with softer materials (plastic/rubber), with smoothed edges for increased safety and comfort (particularly edges).

In some examples, large magnitude or scale state changes that could cause undesirable force or distress to the user may occur only when no one may be in physical contact with column 310, or in the potential path of column 310. In order to facilitate the correct positioning of the one or more users before and/or during a change of column 310 positional configuration, one or more actions may be taken. In some cases, this may include visual, tactile, auditory, other cues, or a combination thereof. In some examples, visual (in the virtual environment) and tactile (vibrational effect from columns in the physical environment) can be employed. For example, these could include subconscious and conscious suggestions, ranging from subtle cues to insistent verbal or color-coded commands, as described with respect to FIG. 7 and component 735, among other examples).

Additionally, a user may hear, feel, or otherwise perceive a pattern or a condition. This condition, such as a pattern, may indicate that a column configuration in the physical space has changed, may be changing, and/or will change. This pattern or condition may indicate one or more options or actions for the user. For example, a pulse pattern (e.g., of the column and/or the tile on which the user may be detected and/or near a location in which the user may be detected) may indicate that a user should move to a different location. This instruction and related operations may, in some cases, be based on detecting column position and/or user position (or multiple user positions of the same user over time or multiple users at the same time or over time).

Figure 3B:
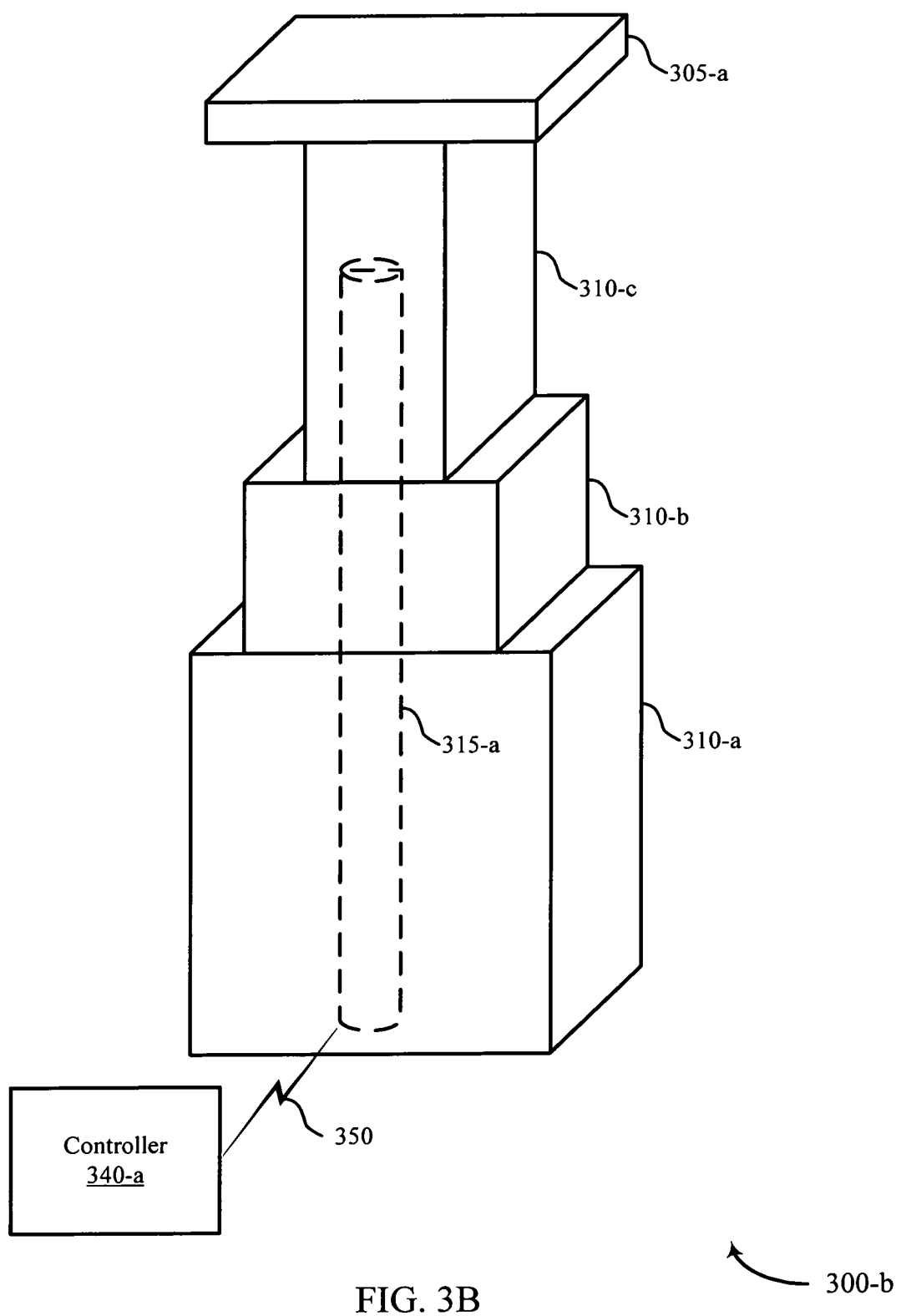

FIG. 3B illustrates an example of a dynamic column and tile structure 300-b in accordance with various aspects of the present disclosure. The dynamic column and tile structure 300-b may include tile 305-a, column base 310-a, column intermediate section 310-b, and column distal section 310-c, among other components and/or elements. In some examples, actuator 315-a may be in contact with, coupled to, connected to, or otherwise joined with tile 305-a, column base 310-a, column intermediate section 310-b, and column distal section 310-c, or a combination thereof. Actuator 315-a may, in some examples, be configured to receive signals from one or more other devices and actuate one or more columns elements (e.g., column base 310-a, column intermediate section 310-b, and column distal section 310-c), one or more tiles (e.g., tile 305-a), other components, or a combination thereof. In some examples, actuator 315-a may be fully surrounded by, at least partially surrounded by, or independent of tile 305-a, column base 310-a, column intermediate section 310-b, and column distal section 310-c, or a combination thereof. In some cases, actuator 315-a may be in contact with, coupled to, or connected with one or more components of one or more columns (e.g., 310-c, 310-b, and/or 310-a) and, based on receiving a signal or other information from another device (e.g., controller 340-a, a user device), may adjust one or more aspects relating to one or more of the columns or sub-components.

In some examples, column 310 may be or include a unitary structure. In some cases, dynamic column and tile structure 300-b may have a constant (or approximately constant cross-sectional area and/or geometry) and may be made from a single material. In other examples, dynamic column and tile structure 300-b may have a varying (or approximately varying cross-sectional area and/or geometry) and may be made from one or more components and/or materials. In some examples, column base 310-*a*, column intermediate section 310-*b*, and column distal section 310-*c*, may be nested or telescoping. Actuator 315-*a* may be configured to extend a length or adjust one or more lengths to allow for a subset of column base 310-*a*, column intermediate section 310-*b*, and column distal section 310-*c* to be exposed.

Figure 4A:
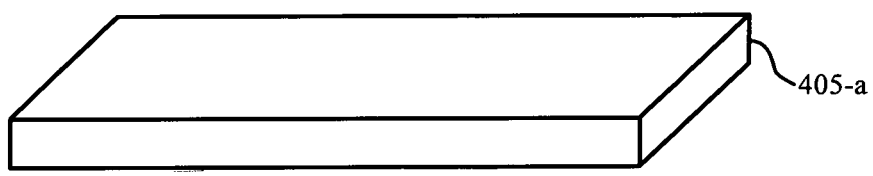
FIG. 4A through 4C illustrate examples of a dynamic column and tile structure in accordance with aspects of the present disclosure.
Figure 4A:
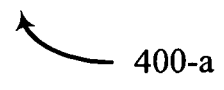
Figure 4B:
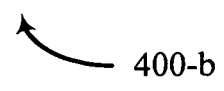
Figure 4C:
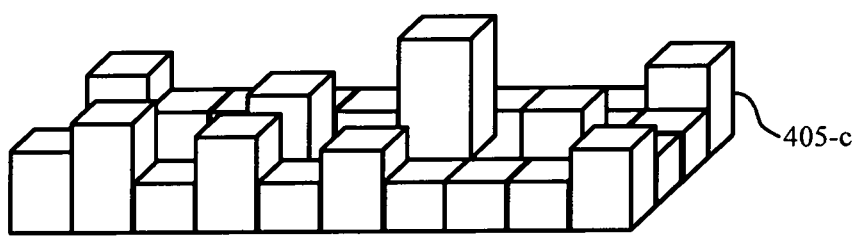

FIGS. 4A through 4C illustrate examples of dynamic column and tile structures 400-*a*, 400-*b*, and 400-*c* in accordance with various aspects of the present disclosure. As shown in FIG. 4A, tile 405-*a* may be or include a unitary piece. In some examples, tile 405-*a* have a rectangular shape. In other examples, the tile structure in an environment may be non-rectangular, geometric, non-geometric, unique, or a combination thereof. In some examples, tile 405-*a* may include or be one component. Tile 405-*a* may include features and/or characteristics according to various aspects of the present disclosure. In some cases, tile 405-*a* may be rigid, bendable, malleable, elastic, or a combination thereof, among other characteristics.

As shown in FIG. 4B, tile 405-*b* may be or include multiple component pieces. In some examples, tile 405-*b* may include sub-components, where at least some of the subcomponents are joined, in contact with each other, coupled, glued, or resting against one or more surfaces. In some examples, tile 405-*b* may have a rectangular shape. Alternatively, in other examples, tile 405-*b* may have various other geometric and/or non-geometric shapes or composite/unique shapes. In other examples, the tile structure in an environment may be non-rectangular, geometric, non-geometric, unique, or a combination thereof. In some examples, tile 405-*b* may include or be multiple similar, same, or different components. In some cases, the components may include a repeating pattern of three-dimensional elements. In some cases, at least some of the one or more of the sub-components (e.g., sub-columns) may be configured to be adjusted, as shown in FIG. 4C. In some examples, this adjustment may be via one or more actuators (e.g., individual actuators, grouped actuators), electrical signals, or other methods based on computer circuitry and related electrical components and/or controllers.

Figure 4D:
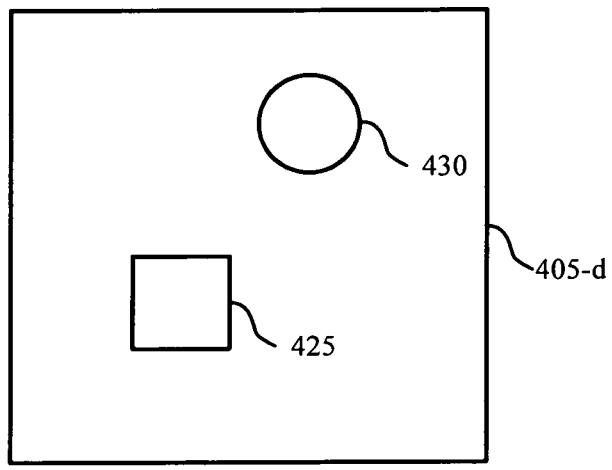
FIG. 4D through 4F illustrate examples of a dynamic column and tile structure in accordance with aspects of the present disclosure.
Figure 4E:
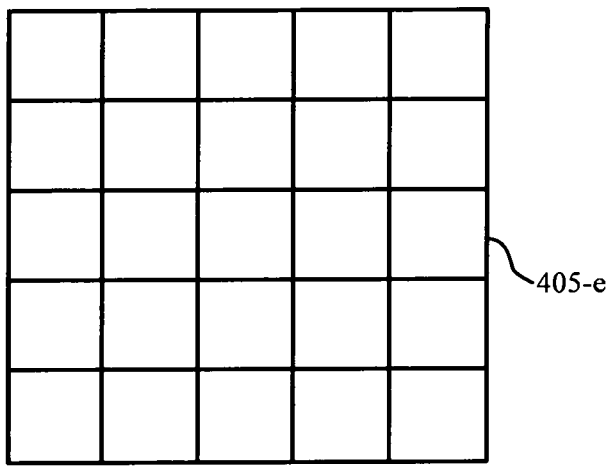
Figure 4E:
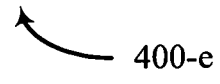
Figure 4F:
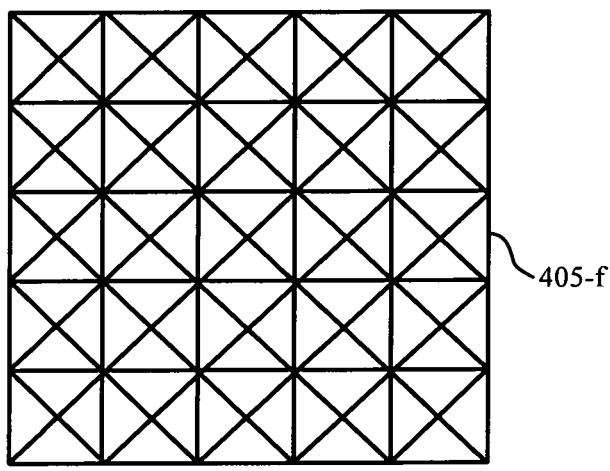

FIGS. 4D through 4F illustrate examples of a dynamic column and tile structures 400-*d*, 400-*e*, and 400-*f-b* in accordance with various aspects of the present disclosure. The components in FIGS. 4D through 4F may relate to a dynamic tessellated surface with individually oscillating tiles for virtual reality applications. The system may facilitate manipulating landscape and surface topography.

As shown in FIG. 4D, a surface based on one or more columns and/or tiles may be shown. In some examples, different tile and/or columns having different characteristics may be incorporated within an environment. In some cases, different shapes of tiles (e.g., among other characteristics) may be used and may correlate with different surface features in a virtual reality environment. For example, a circular component 430 (e.g., a tile, a column) may be depicted as a manhole or a spotlight, while a square component 425 (e.g., a tile, a column) may be depicted as a sidewalk element, a landing, etc. In some examples, different columns having various characteristics may be included. In some examples, a circular column may be adjusted in a vertical direction to represent (e.g., in a virtual environment) a lamppost, a telephone pole, a traffic signal, or a tree, among other examples. In some cases, a rectangular or a square column may be adjusted in a vertical direction to represent one or more objects, including, for example, a fence post, a wall, a sign, or a ladder, among other objects.

As shown in FIGS. 4E and 4F, various tile and/or column patterns may be used in an environment. In some cases, each tile and/or column 405-*e* may have a similar shape (e.g., rectangular, square, geometric, triangular). In some cases, various tile and/or column shapes may be combined in an environment. Some columns having a first shape or cross-sectional area (e.g., circle, rectangle) may support a tile 405-*f* of a different shape or area (e.g., a triangle). In some cases, only a portion of the triangular tiles shown in FIG. 4F may be able to be adjusted via one or more columns, so that only a portion of the tiles (e.g., the tiled surface) may adjust to one or more second position. In other cases, every element of the tiles (e.g., the tiled surface) may be configured to individually adjust separately, during overlapping periods, simultaneously, or some combination.

In some examples, the primary tessellated surface level could be a simple square grid, with square columns, or each column could be further divided into four triangles (e.g., right triangles). This may allow for ninety-degree corners for objects such as walls, by moving four triangle columns as a unit, but would provide greater flexibility in allowing 45 degree angles by moving only two adjacent triangular columns along an edge. Other levels, such as larger supporting column levels below as described with reference to FIGS. 1 and 2, or higher overlaid columns above (e.g., the primary level), may require different shapes for different applications.

Figure 5A:
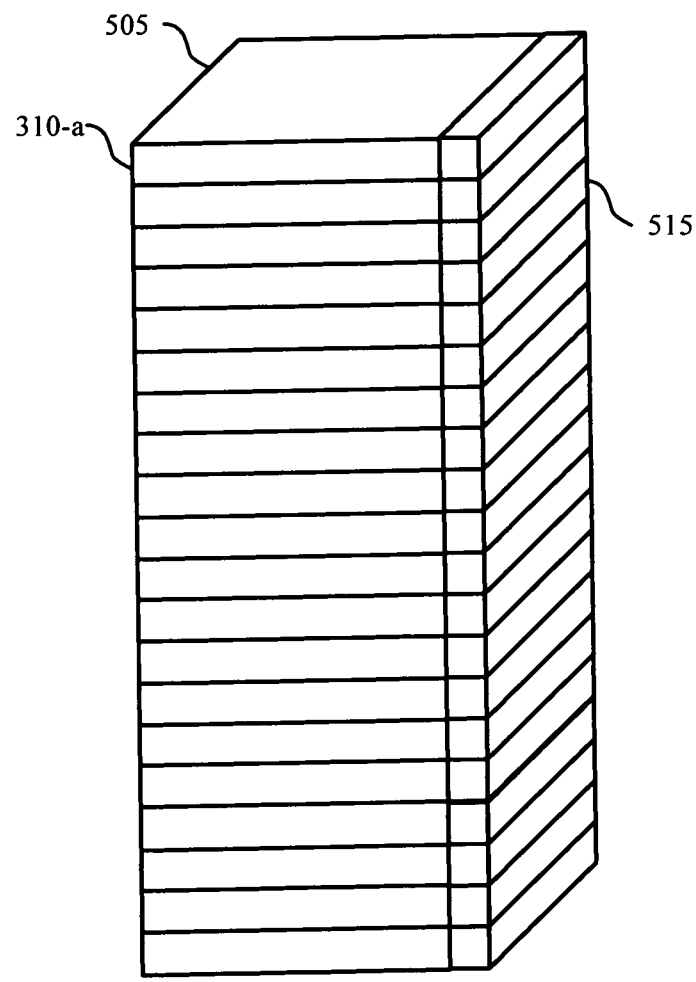
FIGS. 5A and 5B illustrate examples of a dynamic column and tile structure in accordance with aspects of the present disclosure.
Figure 5B:
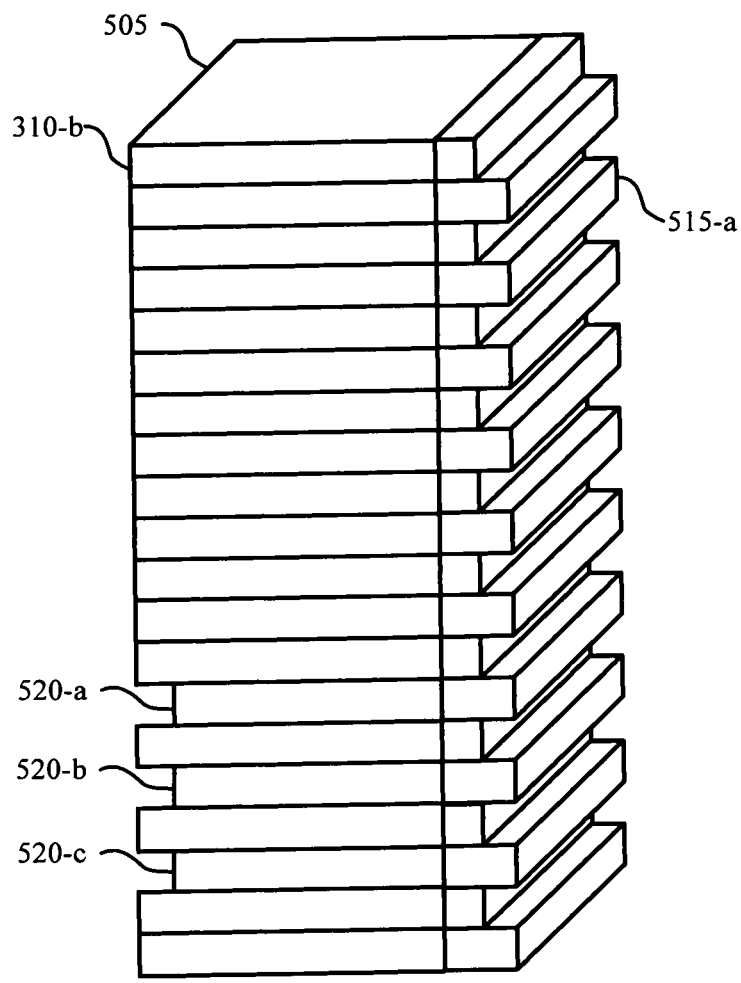

FIGS. 5A and 5B illustrate examples of a dynamic column and tile structure 500-*a* and 500-*b* in accordance with various aspects of the present disclosure. The dynamic column and tile structure 500-*a* and 500-*b* include various layers, which may be examples of the corresponding devices and or elements described with reference to FIGS. 1-3 and/or other figures. In some examples, column structures shown in FIGS. 5A and 5B include a column 500-*a* extending in a first direction (e.g., the vertical, z direction). This column 500-*a* may include tile 505 (which may be positioned on a distal end of column 500-*a*), various columns and/or layers that are configured to remain fixed or are static (e.g., column 310-*a*, 310-*b*), various columns and/or layers that are configured to remain move or adjust in one or more directions and are dynamic (e.g., column 515-*a*, 520-*a*, 520-*b*), other columns configured to perform other functions or movements, or a combination thereof. In some or are static may be configured to a foundation layer 105, support columns 110 (e.g., support columns 110*a*- to 110-*g*), and columns 115 (e.g., column 115-*a* to 115-*u*).

In some cases, column 500-*a* may be configured to adjust or move in a first direction (e.g., a vertical direction), while other columns 515-*a*, 520-*a*, 520-*b* (e.g., sub-columns or sub-components of column 500-*a*) may be configured to adjust or move in a second direction different from the first direction. In some examples, some columns may be configured to adjust shift in the second direction (among others) and allow for texturing and dynamic adjustment on both sides based on the adjustment, as shown in FIG. 5B.

Each column can contain sub-columns for finer-grained control. In some examples, these sub-column may be oriented in a first direction (e.g., a vertical direction), a second direction (e.g., a horizontal direction, a direction different from the first direction, a direction orthogonal to the first direction), another direction, or some combination thereof. In some examples, the finer-grained control may be based on the sub-columns adjusting, moving, and/or extending to enable additional structures, simulations, textures, vibrations, or sounds. For example, a set of sub-columns may adjust in a horizontal direction and may simulate texture of an object as shown in FIG. 5B. Additionally or alternatively, the sub-columns (or a sub-component of at least some sub-columns) may vibrate to produce waves (e.g., sound, air or wind).

Figure 6:
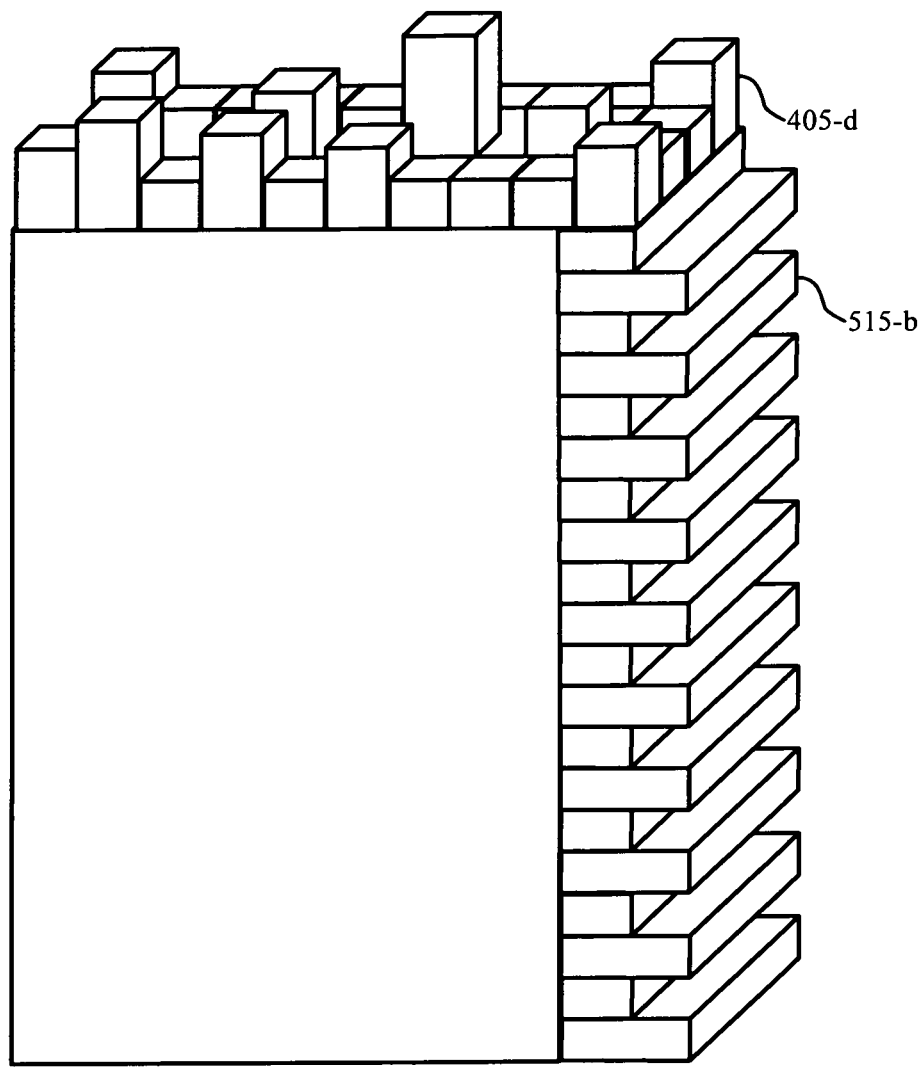
FIG. 6 illustrates examples of a dynamic column and tile structure in accordance with aspects of the present disclosure.

FIG. 6 illustrates examples of a dynamic column and tile structure 600 in accordance with various aspects of the present disclosure. In some examples, various combinations or alternatives of columns, tiles, and/or sub-columns may be combined to increased functionality. In some examples, these hybrid columns and tiles may produce more realistic physical environments and lead to more accurate physical representations of objects. For example, a column having textured sides and a top may more accurately represent a bush, a rock, a plant or another object (e.g., particularly when coordinated with a virtual reality environment and/or related objects.

Figure 7:
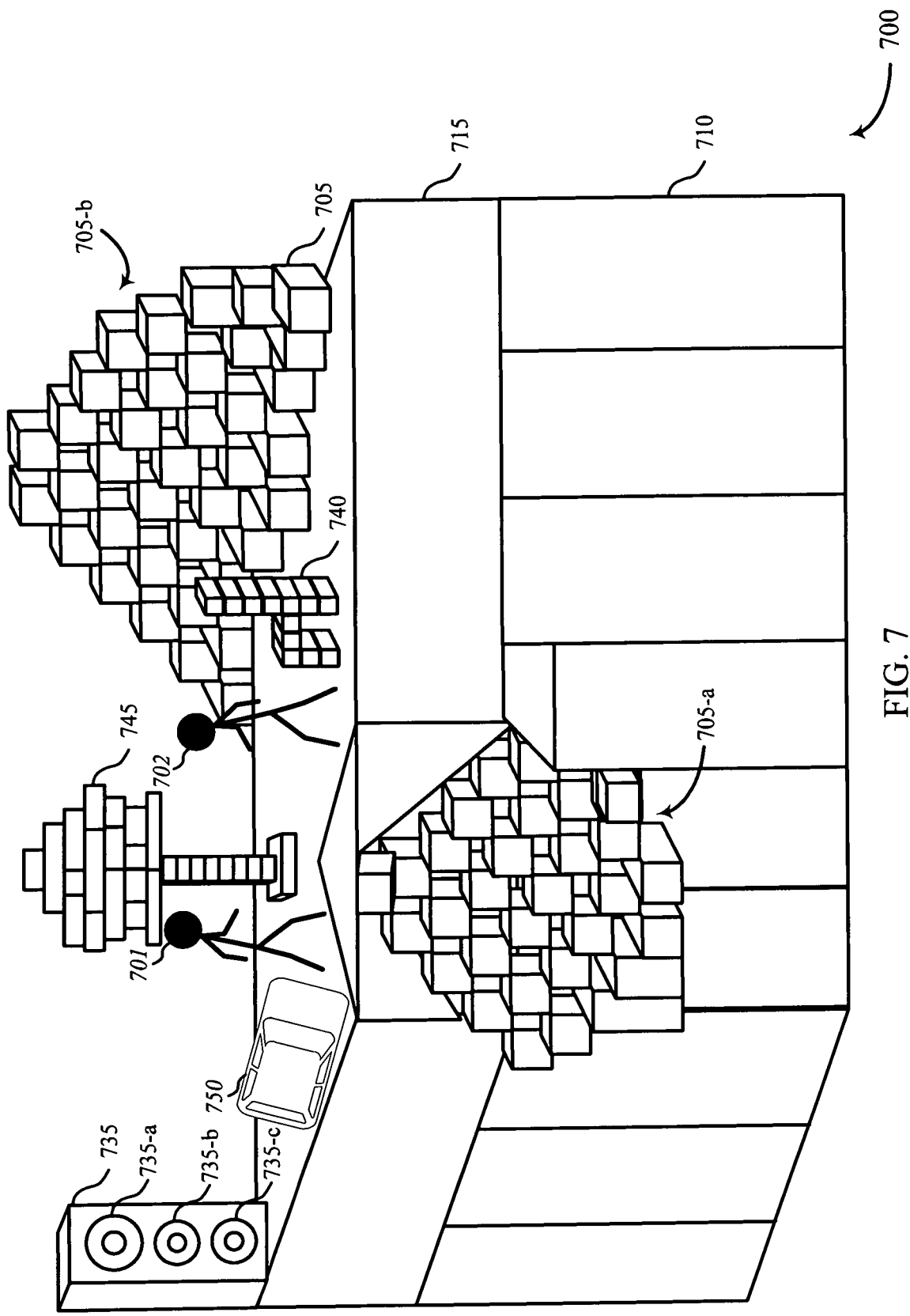
FIG. 7 illustrates a dynamic structure and surface environment in accordance with aspects of the present disclosure.

In some examples, this may be applicable to application beyond floor tiles or columns that comprise the floor. The oscillating columnar tile principle could work in other axes than simply the vertical. Wall surfaces at edges of the floor could also tiled, as could the surfaces of geometric objects (e.g., such as a cube or basketball-shape/sized object that could be controlled wirelessly and powered by battery), as shown in FIG. 7. Oscillating lateral or other axial angles could themselves be incorporated within the sides of other oscillating columnar tiles.

FIG. 7 illustrates an example of a dynamic structure and surface environment 700 in accordance with various aspects of the present disclosure. The components in FIG. 7 may relate to a dynamic tessellated surface with individually oscillating tiles for virtual reality applications. The system may facilitate manipulating landscape and surface topography. The dynamic structures and surface environment 700 includes a foundation layer, support columns 710, and columns 715 (e.g., column 115-a to 115-u). In some cases, dynamic structures and surface system 100 may support adjustment of various structures to augment a physical reality environment with or separate from a virtual reality environment. In some examples, one or more support columns 710 may adjust to expose one or more tiles and/or column section 705-a and/or 705-b. In some examples, a subset of the plurality of columns may be adjusted such that some tiles and/or column section 705 may extend above an initial position or plane (e.g., an initial plane related to the columns initial position or where one or more users (e.g., users 701 and 702) may have been or may be positioned. In some examples, tiles and/or column section 705 may extend upward to form one or more structures above an initial plane (e.g., section 705-b), downward to form or more structures below the initial plane (e.g., section 705-a), or a combination thereof.

In some cases, columns may move in smaller groups, or, for highly simple applications with tens of-cm range ("human"-scale columns), one large column would move, to create a geometrically simple object such as a place to sit, or significantly, with increased z-axis, a wall. For example, a column or a set of columns may adjust to create simulated or actual objects that users may interact with. In some cases, a set of columns may adjust (e.g., separately or together) to create an object (e.g., a table, a chair, a rock, a bush, other object, or a combination thereof). For example, multiple columns may adjust in multiple directions to create an object have texture in multiple ways (e.g., directions, thicknesses), such as tree 745, among other examples. As another example, multiple columns may adjust to create a chair 740. This chair may have straight surfaces based on the granularity of the columns or may have curved surfaces based on the granularity of the columns. The chair may have a back of a first height (e.g., 4 feet tall), a seat of a second height (e.g., 2 feet tall), one or more arms of a third height (e.g., 3 feet tall).

Physical columnar tile based walls could dynamically be created and removed, coordinated artfully with virtual wall appearance, in real time in order to create the illusion of endless physical progression, one which would seem to be validated by touch and simple physical reality (acoustic effects). For example, a set of columns may be adjusted to create a wall (e.g., a straight wall, a curved wall). In some cases, the set of columns may include adjusting additional columns (at a first time, over time, or in real time) to create an endless progression within a large space. In some examples, unintended secondary vibrations induced by the actuators could be addressed through known principles of active sound canceling or movement canceling or adjustment. In principle it's about oscillation: vibration, auditory and even musical principles can be applied to the physical world and/or environment.

As oscillation frequencies increase above the threshold of human hearing (e.g., approximately 20 Hz), each tile could in principle act as a sound production surface itself (i.e., speakers) either alone, or in concert with other tiles. For example, a column or a sub-component may be configured to vibrate based on one or more inputs. In effect the column or the sub-component my act as a speaker and vibrate based on received sound or other signals. For example a first column or set of columns may receive a first signal and may reproduce sounds based on the signal. The first signal may, in some cases, include sounds of a certain type (e.g., music, non-music, instructions), sounds having certain characteristics (e.g., wavelength), classification (e.g., bass, mid-level, treble), other parameters, or some combination thereof. In some cases, certain columns (or the tiles or other sub-components) may reproduce received sounds signals and create a more-immersive environment. The received signals, may be based on a user input, a user selection, a virtual reality environment programming, from a device storing certain signals (e.g., songs, tones, recordings, user recordings of family members, celebrity recordings). This oscillation based on received signals would allow the columns (e.g., a tile surface of the columns) to correlate with one or more elements of the experience such as music, and increase the immersive experience by allowing for additional sound or tactile perception by the user(s).

Additionally, vibrations transmitted to one or more users of virtual reality application through the columns could supplement and enhance traditional air-based speakers and/or environments. As a result, this would allow for interesting effects during virtual musical performances by intelligently combining the two modes of transmission. In some examples, this would include sounds from normal speakers as well as tiles, columns, and/or other components that would also vibrate and/or produce sound to expand the experience.

In some examples, one or more additional devices and/or component 735 may be included as part of the physical environment to further enhance user experience. In some examples these additional devices would be at the periphery of the tiled space, while in others they could be suspended from a ceiling structure from above. Some examples, include fans, lighting, water (e.g., misters, sprinklers, buckets, running sources, waterfalls, wading pools), temperature devices (e.g., heaters, coolers, air conditioning units, ice), sounds (e.g., wind, rain, human sounds, animal sounds), scents (e.g., animal scents, food, rain, perfume/cologne)

other effects, or a combination thereof. Devices and/or component 735 may include one or more subcomponents or features (e.g., 735-a, 735-b, 735-c) that may be the same, similar, or different. As merely one example, large fans 735-a at the perimeter of the area or environment would provide a wind-tunnel effect to simulate atmospheric conditions and propagate artificial scents (e.g., potentially released by subcomponents or feature 735-b), while subcomponent or feature 735-c may be a water or sound based feature to further augment user experience. These auxiliary simulators may, in some examples, generate more specialized wind effects and could be activated in conjunction with, dependent upon, independent of, or in some other combination with the dynamic columnar movement and/or other aspects described in the present disclosure.

In some examples, auxiliary motion simulators for some objects may be positioned within the physical environment (e.g., a first time or a beginning of an experience, dynamically based on programming, user interaction, other parameters or information, or a combination thereof. For example, one or more vehicles 750 (e.g., cars, amusement park rides, rocket and airplane cockpits, bicycles, personal transporters, skateboards etc.), among other examples, can be autonomously positioned as needed and interface with the columns underneath (or in some cases, may be independent of any columns or other adjustable structures), and a user can then enter and exit vehicles/simulators in a way that creates a seamless experience. In some examples, these simulators would provide more detailed and realistic tactile and haptic interfaces for users, e.g. steering wheels and other controls). In some examples, they would contain additional and enhancing motion simulation capabilities to augment the columns underneath (e.g., facilitating additional movement, such as rotation, more localized and subtle vibration effects, and wind effects).

In some examples, one or more tiles and/or columns of section 705 may be configured to track a user and simulate various surfaces and/or conditions. By tracking a user's location and/or position information, one or more tiles and/or columns may be configured to localize adjustments, vibrations, responses, accelerations, or other movements to simulate various surfaces or conditions. For example, one or more tiles and/or columns may be configured to simulate bouncy, crunchy, or cushioned surfaces or conditions for simulating various walking surface types on a per-area or per-individual tile or column basis. In some cases, one or more tiles and/or columns may be configured to track a user and simulate various surfaces and/or conditions when correlated or related to additional sensory perceptions. For example, the one or more tiles and/or columns may be configured to track a user and simulate various surfaces and/or conditions at the same time that a user hears a noise (e.g., gravel crunching, mud squishing, fire crackling), sees an image (e.g., a gravel walkway, a muddy path, a grass hill, a fire), smells a scent (e.g., rain, dew, food, fire/smoke), other perceptions, or some combination.

Visual and tactile suggestions, including subconscious, and conscious (ranging from subtle cues to insistent commands) can be employed. For example, the columns that need to move in order to effect the desired new configuration, but are obstructed by the presence of one or more users in the physical environment, could be visually indicated in the virtual space. For examples, relevant tiles may glow red (in the virtual space) when a transition script is initiated but a user (e.g., human or non-human object) is exerting a force on the column. Additionally or alternatively, subtle vibration could also be employed, either at a noticeable or subconscious level (or in a pattern that research has determined works well on humans). The user may move or the offending object to any surrounding non red-glowing tiles and the transition script can proceed apace.

The system may also be capable of creating inertial and gravimetric effects on people and objects. In some examples, system may manipulate air and other transmission mediums to create waves, including generating sound waves.

In some examples, one or more components or elements (by itself or based on information received) may determine whether a user of the virtual reality application in association with the physical environment satisfies a bad actor criteria. For example, by determining or detecting certain actions of a bad actor, some structure or organization may be actuated in response. This determination or detection may be based on detecting position information (at a first time, multiple times, or a combination thereof), sensor data (e.g., including from sensors within a column or independent of a column, video data, audio data, facial recognition), other information, or a combination thereof. As one example, by detecting that a user is contacting one or more columns aggressively (e.g., based on being greater than a threshold activity determination), or inappropriately interacting with other users present in the same physical room, remedial action can be taken. In some cases, this may include extending columns in a shape to contain or limit movement of the user (i.e., extending a group of columns to create a box). Alternatively, column orientations that were in use may cease based on detected behavior (i.e., at least some, if not all, columns may return to an initial setting and eliminate any shape to protect the columns and the user).

Additionally or alternatively, someone who is passed out or not in control of their faculties could be "bedded" and simply "rolled" to the appropriate location where security or medical personnel are waiting for them. For example, if a user refuses to move or can't move the columns may be actuated to "move" the user to a designated area to prevent injury or to allow other users participating to continue moving through the environment. This "movement" may be based at least in part on oscillating the columns up and down to "roll" the user from a first location to another location.

In some examples, a socially interactive experience in sharing virtual reality environments together in different rooms, in different environments, and/or in different locations. In some examples, this may include users being physically present in the same space (e.g., FIG. 7), or at separate sites that can be programmed to be physically similar or identical so the users can essentially "share" the same virtual space that has physically similar or identical characteristics even when separated by long distances. The tessellated surface could be a grid (simple) triangular (compound) or a combination of polygons in order to approximate various geometric shapes.

Real-time position of each column may be constantly tracked to millisecond accuracy by the mechanics and logic of the linear actuator/controller itself, among other devices. For example, the actuator may be calibrated to track the position of at least some, if not each, of the columns based on tracking an initial position and comparing a second position to the initial position (e.g., at an isolated time, over a period).

This may perhaps additionally be performed by laser or other wavelength of electromagnetic radiation for safety redundancy. For example, a device may be a first fixed location relative to a column. After the column has moved (e.g., in a first vertical direction), a laser or other sensor device may identify a distance that the column has moved (e.g., a distance that the column has extended in a vertical direction).

There can be a hierarchy of column sizes with large ones for gravimetric effects, medium ones with actuators resting within the large columns for human-scale surfaces (chairs, boulders tree stumps, etc.), and smaller ones for textural effects and vibrational wave propagation (music, and other higher-level oscillation effects).

For example, as shown in FIGS. 1, 2, and 7, among others, a first set of columns may facilitate gravimetric effects. These columns may include those in a first layer and/or those in a second layer (e.g., larger columns having a greater cross-sectional area). This first set of columns may be configured to move at calculated speeds to simulate gravimetric effects, including moving the "floor" (e.g., a top layer of the columns). In some cases, this movement may be based on user location, velocity, acceleration, a virtual reality simulation or program, other information, or some combination.

Columns could move globally for gravimetric effects that provide a sensation of acceleration. In some examples, the first set of columns (e.g., that may be immediately next to each or scattered as a subset throughout a larger number of columns), may move upward or downward at a particular rate to simulate various levels of increased or decreased gravity, or a complete lack thereof. In some cases, this may be based on movement of the user, position information related to the user, virtual reality programming or parameters, other information, or some combination.

They could also move globally beneath the limits of the human perception of acceleration (I.e. extremely slowly), in order to set up or prepare the next gravimetric effect or other structural effect for an environment changes. This may, in some examples, impose a certain limit on how much freedom, or more specifically the cadence of events, that an "experience designer" has in deploying gravimetric effects. But this also depends on the z-axis length and freedom of movement (range) of the columns.

There is in principle no hard limit on the length of each column; columns of several or even tens of meters can be utilized for larger-scale gravimetric effects: such as the sensation of become lighter, heavier, falling, floating, or accelerating upwards. Column height correlates positively with gravimetric event cadence. For example, when a user is positioned on or directly above a set of columns, adjusting the column height of one or more columns may correlate with creating gravimetric events or feeling that may be experienced by the user or the users.

In some examples, based on tracking user movement and/or action (using sensor data, whether from the columns and/or separate), one or more devices may track when an object or person is falling, and have the columns "catch" and safely decelerate the person to minimize injury (e.g., feeling much like an airbag or trampoline). This may be based on calculations about the user (e.g., height, weight), the current position of one or more columns or tile, predicting a time of the user's contact with the wall based on perceived sensor data, comparing the time of the contact with an ability of the column to be adjusted at a speed, other data and/or factors, or some combination thereof.

Figure 8:
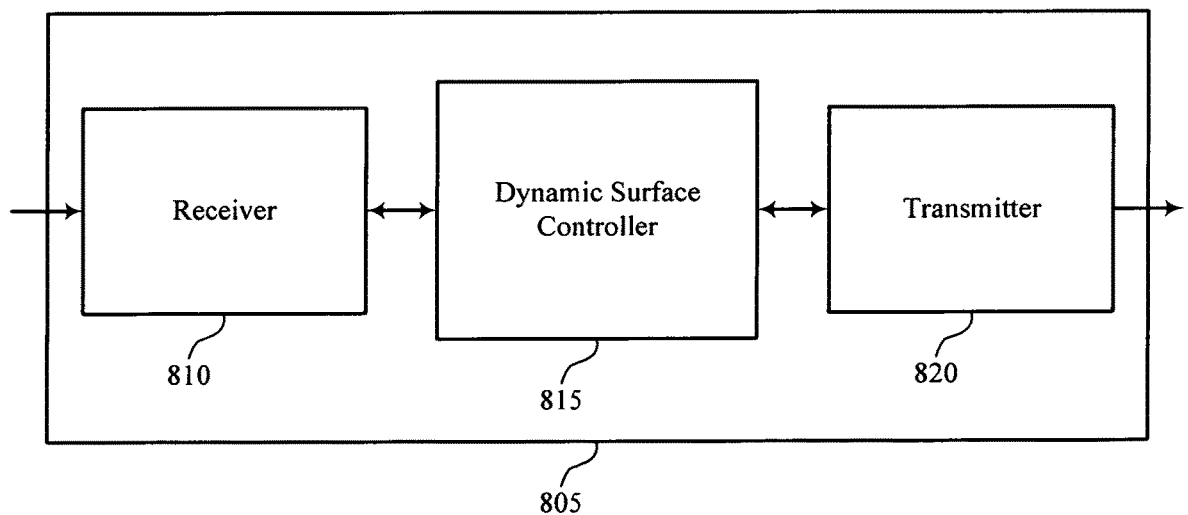
FIG. 8 shows a block diagram of a device that supports configuration of dynamic structure and surface environment in accordance with various aspects of the present disclosure.

FIG. 8 shows a block diagram 800 of a device 805 that supports configuration of dynamic tessellated surface with individually oscillating tiles for virtual reality applications in accordance with various aspects of the present disclosure. In some examples, device 805 may be a wired and/or a wireless device and may be configured to communicate with one or more other devices. Device 805 may include receiver 810, dynamic surface controller 815, and transmitter 820. Device 805 may also include a processor. Each of these components may be in communication with one another (e.g., via one or more buses).

The components of the device 805 may, individually or collectively, be implemented using one or more application-specific integrated circuits (ASICs) adapted to perform some or all of the applicable functions in hardware. Additionally or alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each component may also be implemented—in whole or in part—with instructions embodied in memory formatted to be executed by one or more general and/or application-specific processors.

Receiver 810 may receive information such as packets, user data, or control information associated with various information channels (e.g., control channels, data channels, and information related to dynamic tessellated surface with individually oscillating tiles for virtual reality applications, etc.). Information may be passed on to other components of the device.

Dynamic surface controller 815 may identify a location of user in a structure at a first time, identify a position of each of a plurality of columns, each column having a length in a first direction, a cross-sectional area in a second direction, and a top surface, and adjust a position of a subset of the plurality of columns based at least in part on the location of the user and the position of the subset of the plurality of columns.

Transmitter 820 may transmit signals generated by other components of the device. In some examples, the transmitter 820 may be collocated with a receiver 810 in a transceiver module. The transmitter 820 may include a single antenna, or it may include a set of antennas.

Figure 9:
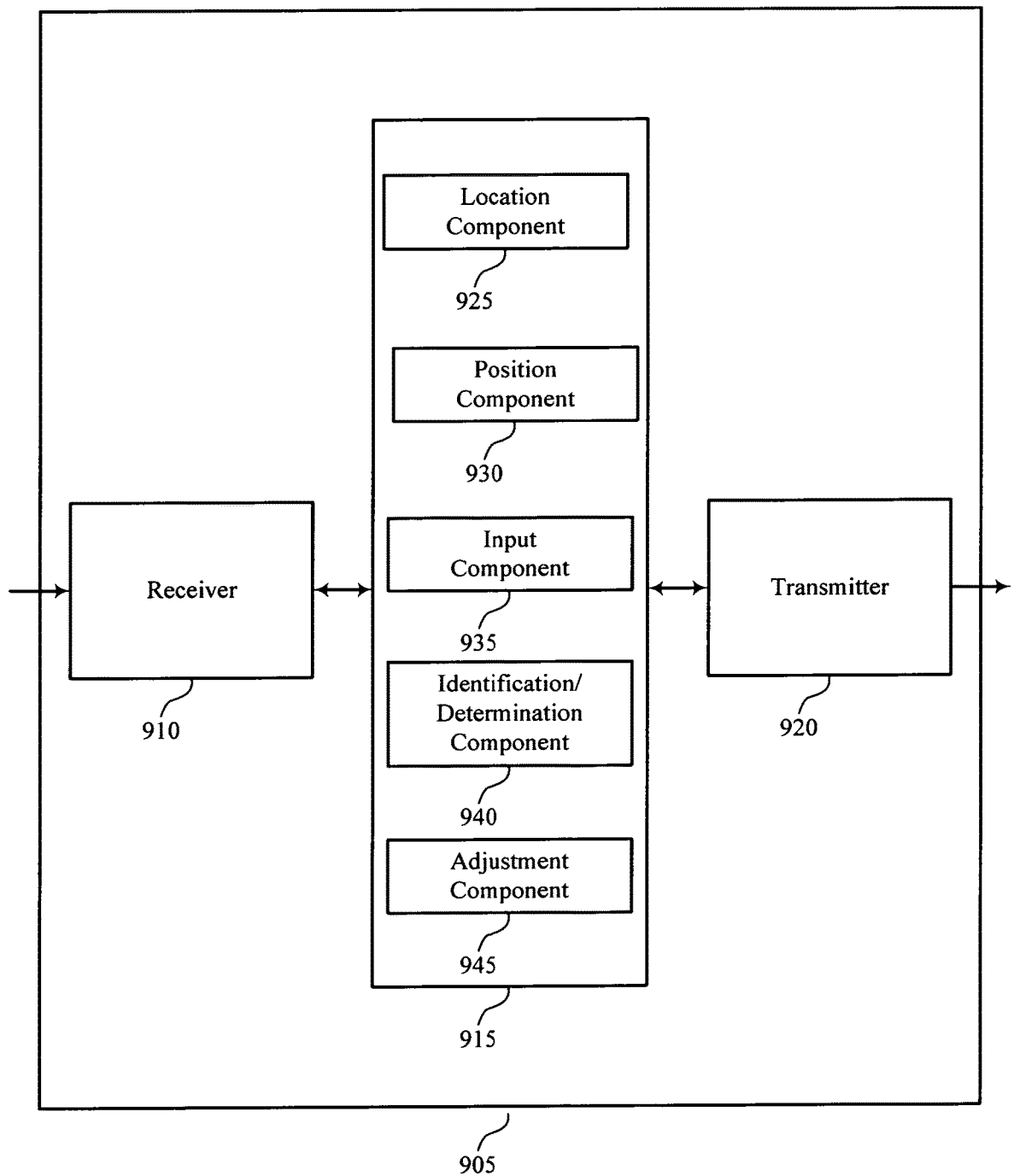
FIG. 9 shows a block diagram of a device that supports configuration of dynamic structure and surface environment in accordance with various aspects of the present disclosure.

FIG. 9 shows a block diagram 900 of a device 905 that supports configuration of dynamic tessellated surface with individually oscillating tiles for virtual reality applications in accordance with various aspects of the present disclosure. Device 905 may be an example of aspects of a device 805 or a dynamic surface controller 815 as described with reference to FIG. 8. In some examples, device 805 may be a wired and/or a wireless device and may be configured to communicate with one or more other devices. Device 905 may include receiver 910, dynamic surface controller 915, and transmitter 920. Device 905 may also include a processor. Each of these components may be in communication with one another (e.g., via one or more buses).

Receiver 910 may receive information such as packets, user data, or control information associated with various information channels (e.g., control channels, data channels, and information related to dynamic tessellated surface with individually oscillating tiles for virtual reality applications, etc.). Information may be passed on to other components of the device. The receiver 910 may be an example of aspects of the receiver 810 described with reference to FIG. 8.

Dynamic surface controller 915 may be an example of aspects of the dynamic surface controller 815 described with reference to FIG. 8. Dynamic surface controller 915 may include location component 925, position component 930, input component 935, identification/determination component 940, and adjustment component 945.

Location component 925 may identify a location of user in a structure at a first time and identify a second location of the user at a second time after the first time. In some examples, adjusting the position of the at least one column may be based on the first position and the second position. In some cases, location component 925 may identify a location of a user based on received sensor data. For example, a sensor associated with one or more tiles (e.g., tile 305) or columns (e.g., column 310) may detect a sensor condition. A sensor condition may include detected motion, pressure, sound, heat. For example, a user may step on to a tile (i.e., tile 305) and a sensor associated with the tile may detect that the user has stepped on to the tile. As a result, location component 925 may identify the location of the user based on received sensor data associated with the stepped tile.

Additionally, location component 925 may identify a location of the user in a structure (i.e., physical environment) based on location information associated with the virtual environment. For example, location component 925 may identify a location of the user in the virtual environment. Location component 925 may, as result, map the physical environment of the structure to the virtual environment. In some examples, location component 925 may identify the location of the user in the structure based on correlating the virtual environment and the physical environment of the structure in association with received sensor data.

Location component 925 may, additionally or alternatively, identify a location of the user based on received signals from a wearable device (e.g., a virtual reality headset, wristband) on the user. In some cases, the wearable device may transmit location information to one or more sensors associated with the structure, and the sensors may report the location information to a control device (e.g., dynamic surface controller, server, virtual reality manager). In some examples, the wearable tracking device may additionally transmit a user ID identifying the user of the wearable tracking device.

Position component 930 may identify a position of each of a set of columns, each column having a length in a first direction, a width in a second direction, and a top surface. In some examples, position component 930 may identify a position of each of a plurality of columns, each column having a length in a first direction, a cross-sectional area in a second direction, and a top surface. Additionally, position component 930 may identify a second location and/or position of the user at a second time after the first time, wherein adjusting the position of the at least one column may be based at least in part on the first position and the second position.

Input component 935 may perform one or more operations and/or functions relating to one or more inputs. In some examples, input component 935 may receive one or more various inputs such as data and/or information. Examples of one or more inputs may include, but are not limited to location information, user input, user characteristic input, audio input, image input, video input, picture input, text input, voice input, weight input, time input, numerical input, some combination, and/or other inputs. In some examples, input component 935 may perform one or more operations on one or more sets of input information and/or data. These operations may include, but are not limited to, receiving, analyzing, ordering, grouping, organizing, assembling, comparing, determining one or more characteristics, identifying input type or other information, other operations, or some combination related to one or more inputs. One or more operations may be performed using a pre-programmed algorithm, a dynamic algorithm based on updated and/or addition information such as inputs (among other things), and/or some combination of these algorithms, among others.

In some examples, at least some of the various inputs may be captured and/or received by one or more devices in an environment (e.g., sensors, user equipments (UEs), cameras) based on one or more characteristics, including but not limited to motion, voice command, time, proximity, relative or absolute location, user request, user verification, prompt by an automation system, based on one or more specific actions relating to one or more system components, some combination, and/or others. In some examples, one or more operations relating to inputs may be performed automatically based at least in part on one or more criteria, one or more user preferences, pre-determined system preferences, a user profile setting, a default, a passage of time, one or more sensor inputs, a user action relating to an electronic device, a user action at a control panel, other information, and/or some combination.

In some examples, input component 935 may receive input data from a local memory storage unit that may be part of or separate from an environment system. In some examples, input component 935 may receive input stored locally, stored on a remote server, and/or stored based on a local area network that facilitates communication and memory storage sharing between similarly-located home automation systems. For example, input component 935 may receive one or more types of data from a memory storage device positioned within a structure, like a home or a warehouse. These types of data may include, but are not limited to, user preferences, user profiles, user actions, user location, relative or absolute locations, information relating to significant events, security features, image data (e.g., photos, videos), combinations of these, and/or other information. The input component 935 may receive this data directly and/or indirectly using one or more wired and/or wireless links from the memory storage device and, based at least in part on this data, perform one or more operations and/or functions relating to product ordering.

For example, input component 935 may receive image data associated with a virtual reality environment or program or based on a user's actions in a physical environment or a virtual environment. In some examples, the system may, via an algorithm, analyze the data, extract relevant information, and then initiate one or more other actions based on information.

In some examples, identification/determination component 940 may perform one or more operations and/or functions relating to one or more inputs, actions, user positions, column positions or operations, parameters, characteristics, some combination, and/or other information and/or data. In some examples, identification/determination component 940 may utilize one or more algorithms to perform one or more operations and/or functions relating to one or more different types of data, including, but not limited to dynamic column adjustment parameters. In some examples, examples of such parameters may include one or more types of past, present, and/or future column and/or user position information, adjustments of one or more objects and/or structures, virtual reality environment programming and/or user interactions, information of a user including actions after or movement based on previous adjustments or other operations, and/or other information and/or data. In some examples, one or more default parameters or characteristics may be identified based at least in part on user choice, user preferences, system operations, system determinations relating user location and/or actions, other information, or a combination thereof.

In some examples, identification/determination component 940 may identify a location of one or more users in a structure at one or more times. This may be based on sensor data obtained by sensors in contact with or part of one or more columns, sensors data received from other sources and/or components (e.g., video sensor data, proximity data), other sources, or a combination thereof. This identification may allow for tracking the user at various times to identify movement, patterns, speed, direction, velocity, acceleration, and/or other parameters.

In some examples, identification/determination component 940 may identify a position of one or more columns in a structure at one or more times. This may be based on sensor data obtained by sensors in contact with or associated with one or more columns, sensor data received from other sources and/or components (e.g., video sensor data, proximity data), other sources, or a combination thereof. This identification may allow for tracking one or more positions of one or more columns user at various times to identify movement, patterns, speed, direction, velocity, acceleration, and/or other parameters related to column adjustment.

In some examples, identification/determination component 940 may identify an action of a user. In some cases, this identification may include identifying one or more actions relative to a column. This may, in some cases, be based on the location of the user relative to one or more columns (e.g., one or more columns in a subset that have been and/or will be adjusted from a first position to a second position, one or more columns that have not been and/or will not be adjusted). This may be based on sensor data obtained by sensors in contact with or associated with one or more columns, sensor data received from other sources and/or components (e.g., video sensor data, proximity data), other sources, or a combination thereof.

Identification/determination component 940 may perform one or more operations and/or functions relating to one or more inputs, identification, positions, parameters, notifications, users, operations, initiations, and/or other actions. Identification/determination component 940 may determine data and/or other information relating to one or more columns, subset of columns, tiles, or subset of tiles. In some examples, identification/determination component 940 may determine to adjust a position of at least one column associated with the physical environment. In some cases, adjusting the position of the at least one column may be based on information related to the virtual reality environment. That is, identification/determination component 940 may adjust a position of a column based on a location of the user in the physical environment and/or the virtual reality environment. In some cases, identification/determination component 940 may adjust a column in the physical environment based on additionally a position of a subset of a plurality of columns in the physical environment. Identification/determination component 940 may adjust a column in the physical environment based on a proximity to the user and position of a subset of a plurality of columns in the physical environment.

Identification/determination component 940, in some examples, may determine a parameter associated with the user based the first position and the second position. In some cases, identification/determination component 940 may adjust one or more columns based on the parameter. A parameter may include a speed, a direction, a velocity, an acceleration, or a combination thereof. For example, identification/determination component 940 may adjust the position of a subset of a plurality of columns based on one or determined parameters. These operations may include, but are not limited to, receiving, analyzing, ordering, grouping, determining one or more characteristics, identifying input type or other information, related to one or more inputs, some combination, and/or other operations. One or more operations may be performed using a pre-programmed algorithm, a dynamic algorithm based on updated and/or addition information such as inputs, and/or some combination of these algorithms, among others.

Adjustment component 945 may adjust a position of a subset of the set of columns based on the location of the user and the position of a subset of the set of columns. In some examples, adjustment component 945 may determine to adjust the position of at least one column based at least in part on the location of the user and the position of a subset of the plurality of columns, wherein adjusting the position of the subset of the plurality of columns may be based at least in part on the determination. In some examples, adjustment component 945 may adjust a first column to a first height in the first direction; and adjust a second column to a second height different from the first height in the first direction. In some examples, adjusting the first column overlaps with adjusting the second column.

Transmitter 920 may transmit signals generated by other components of the device. In some examples, the transmitter 920 may be collocated with a receiver 910 in a transceiver module. For example, the transmitter 920 may be an example of aspects of the transmitter 820 described with reference to FIG. 8. The transmitter 920 may include a single antenna, or it may include a set of antennas.

Figure 10:
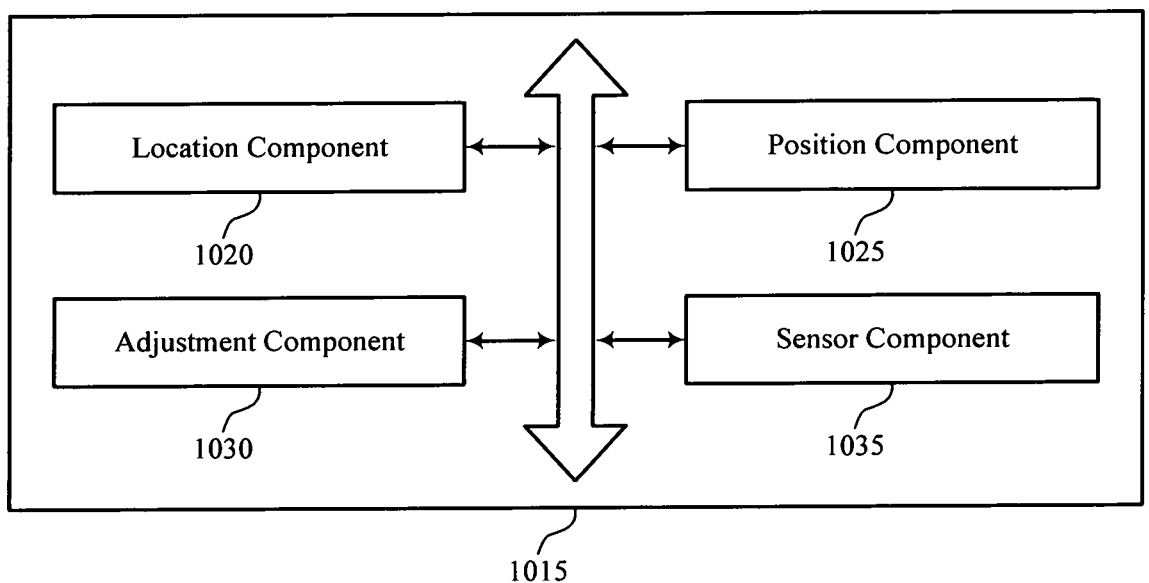
FIG. 10 shows a block diagram of a dynamic surface controller that supports configuration of dynamic structure and surface environment in accordance with various aspects of the present disclosure.

FIG. 10 shows a block diagram 1000 of a dynamic surface controller 1015 that supports configuration of dynamic tessellated surface with individually oscillating tiles for virtual reality applications in accordance with various aspects of the present disclosure. The dynamic surface controller 1015 may be an example of aspects of a dynamic surface controller 815 or a dynamic surface controller 915 described with reference to FIGS. 8 and 9. The dynamic surface controller 1015 may include location component 1020, position component 1025, adjustment component 1030, and sensor component 1035. Each of these components may communicate, directly or indirectly, with one another (e.g., via one or more buses).

Location component 1020 may identify a location of user in a structure at a first time and identify a second location of the user at a second time after the first time. In some examples, adjusting the position of the at least one column may be based on the first position and the second position. Location component 1020 may identify a location of user in a structure at a first time and identify a second location of the user at a second time after the first time. In some examples, adjusting the position of the at least one column may be based on the first position and the second position. In some cases, location component 1020 may identify a location of a user based on received sensor data.

For example, a sensor associated with one or more tiles (e.g., tile 305) or columns (e.g., column 310) may detect a sensor condition. A sensor condition may include detected motion, pressure, sound, heat. For example, a user may step on to a tile (i.e., tile 305) and a sensor associated with the tile may detect that the user has stepped on to the tile. As a result, location component 1020 may identify the location of the user based on received sensor data associated with the stepped tile.

Additionally, location component 1020 may identify a location of the user in a structure (i.e., physical environment)

based on location information associated with the virtual environment. For example, location component 1020 may identify a location of the user in the virtual environment. Location component 1020 may, as result, map the physical environment of the structure to the virtual environment. In some examples, location component 1020 may identify the location of the user in the structure based on correlating the virtual environment and the physical environment of the structure in association with received sensor data.

Location component 1020 may, additionally or alternatively, identify a location of the user based on received signals from a wearable device (e.g., a virtual reality headset, wristband) on the user. In some cases, the wearable device may transmit location information to one or more sensors associated with the structure, and the sensors may report the location information to a control device. In some examples, position component 1025 may be, include features, or be an example of the location component 925.

Position component 1025 may identify a position of each of a set of columns, each column having a length in a first direction, a width in a second direction, and a top surface. In some examples, position component 1025 may identify a position of each of a plurality of columns, each column having a length in a first direction, a cross-sectional area in a second direction, and a top surface. Additionally, position component 1025 may identify a second location and/or position of the user at a second time after the first time, wherein adjusting the position of the at least one column may be based at least in part on the first position and the second position.

In some examples, position component 1025 may identify a position of one or more columns in a structure at one or more times. This may be based on sensor data obtained by sensors in contact with or associated with one or more columns, sensor data received from other sources and/or components (e.g., video sensor data, proximity data), other sources, or a combination thereof. This identification may allow for tracking one or more positions of one or more columns user at various times to identify movement, patterns, speed, direction, velocity, acceleration, and/or other parameters related to column adjustment.

In some examples, position component 1025 may identify an action of a user. In some cases, this identification may include identifying one or more actions relative to a column. This may, in some cases, be based on the location of the user relative to one or more columns (e.g., one or more columns in a subset that have been and/or will be adjusted from a first position to a second position, one or more columns that have not been and/or will not be adjusted). This may be based on sensor data obtained by sensors in contact with or associated with one or more columns, sensor data received from other sources and/or components (e.g., video sensor data, proximity data), other sources, or a combination thereof.

Adjustment component 1030 may adjust a position of a subset of the set of columns based on the location of the user and the position of a subset of the set of columns. In some examples, adjustment component 1030 may determine to adjust the position of at least one column based at least in part on the location of the user and the position of a subset of the plurality of columns, wherein adjusting the position of the subset of the plurality of columns may be based at least in part on the determination. In some examples, adjustment component 1030 may adjust a first column to a first height in the first direction; and adjust a second column to a second height different from the first height in the first direction. In some examples, adjusting the first column overlaps with adjusting the second column.

Sensor component 1035 may sensor data detected from within the structure, wherein identifying the location of user may be based at least in part on the sensor data. In some cases, the sensor data comprises data associated with a sensor in contact with a column of the plurality of columns, or data associated with a sensor isolated from the plurality of columns, or a combination thereof. Additionally or alternatively, the sensor data comprises video data, audio data, GPS data, or a combination thereof. The sensor data may additionally or alternatively include video data, audio data, GPS data, or a combination thereof.

In some examples, sensor component 1035 may determine a parameter associated with the user based at least in part on the first position and the second position. A parameter may include a speed, a direction, a velocity, an acceleration, or a combination thereof. In some examples, sensor component 1035 may identify an action of the user relative to a column of the subset of the plurality of columns based at least in part on the location of the user or sensor data.

Figure 11:
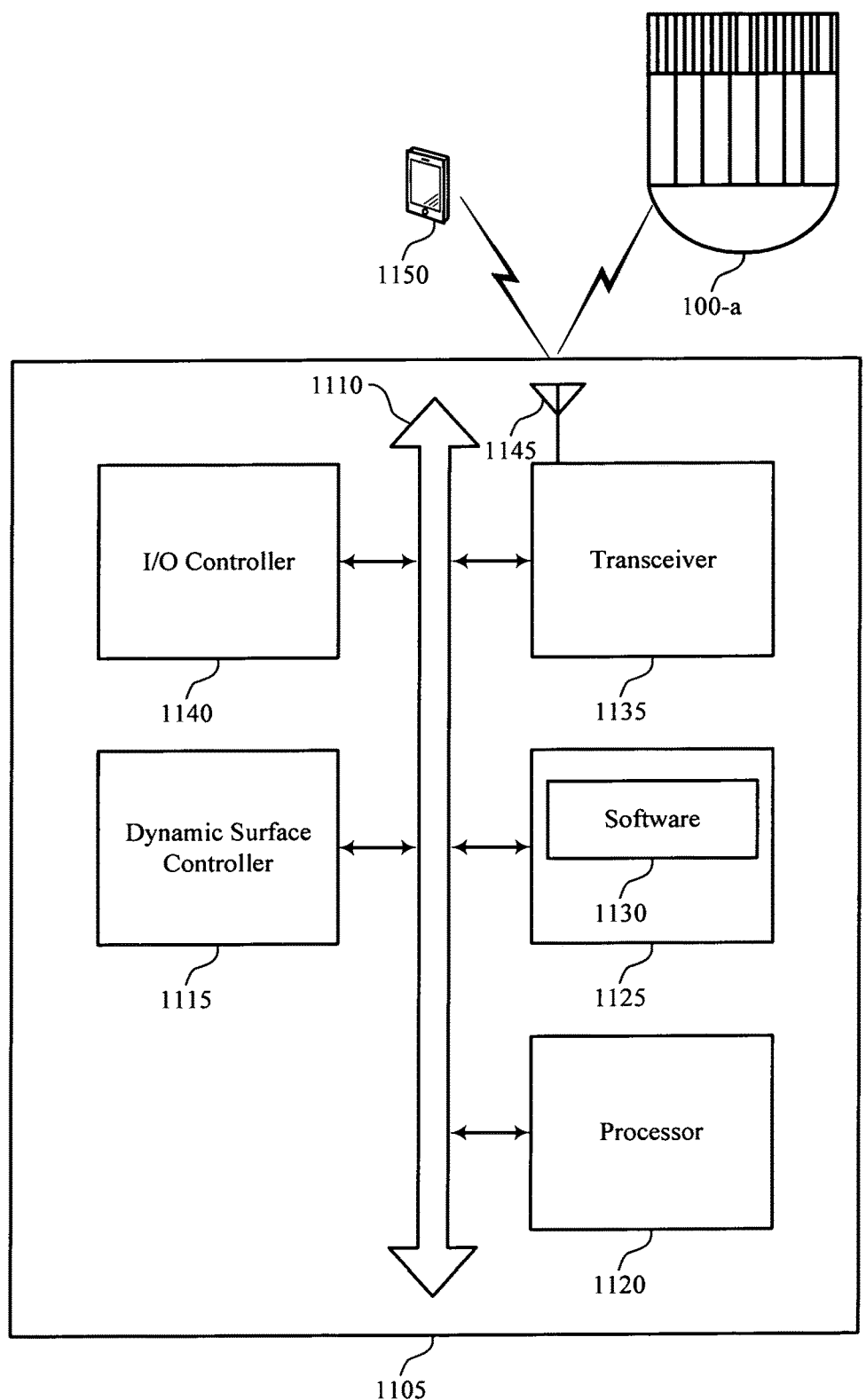
FIG. 11 shows a diagram of a system that supports configuration of dynamic structure and surface environment applications in accordance with various aspects of the present disclosure.

FIG. 11 shows a diagram of a system 1100 including a device 1105 that supports configuration of dynamic tessellated surfaces with individually oscillating tiles for virtual reality applications in accordance with various aspects of the present disclosure. Device 1105 may be an example of or include the components of device 805, device 905, or a dynamic surface controller 815 as described above, e.g., with reference to FIGS. 1, 8, and 9. Device 1105 may include components for bi-directional data communications including components for transmitting and receiving communications, including dynamic surface controller 1115, processor 1120, memory 1125, software 1130, transceiver 1135, and I/O controller 1140. These components may be in electronic communication via one or more busses (e.g., bus 1110). In some examples, device 1105 may communicate bi-directional data using one or more antennas 1145 (which may be included in or separate from transceiver 1135) to one or more components of environment structure 100-*a*, a user equipment (UE) 1150, other devices, or a combination thereof. In some cases, the device 1105 may include a single antenna 1145. However, in some cases the device may have more than one antenna 1145, which may be capable of concurrently transmitting or receiving multiple wireless transmissions.

Processor 1120 may include an intelligent hardware device, (e.g., a general-purpose processor, a digital signal processor (DSP), a central processing unit (CPU), a microcontroller, an application-specific integrated circuit (ASIC), an field-programmable gate array (FPGA), a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting dynamic tessellated surface with individually oscillating tiles for virtual reality applications).

Memory 1125 may include random access memory (RAM) and read only memory (ROM). The memory 1125 may store computer-readable, computer-executable software 1130 including instructions that, when executed, cause the processor to perform various functions described herein. In some cases, the memory 1125 may contain, among other things, a basic input/output system (BIOS) which may control basic hardware and/or software operation such as the interaction with peripheral components or devices.

Software 1130 may include code to implement aspects of the present disclosure, including code to support dynamic tessellated surface with individually oscillating tiles for virtual reality applications. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas.

I/O controller 1140 may manage input and output signals for device 1105. I/O controller 1140 may also manage peripherals not integrated into device 1105. In some cases, I/O controller 1140 may represent a physical connection or port to an external peripheral. In some cases, I/O controller 1140 may utilize an operating system such as iOS®, ANDROID®, MS-DOS®, MS-WINDOWS®, OS/2®, UNIX®, LINUX®, or another known operating system.

Figure 12:
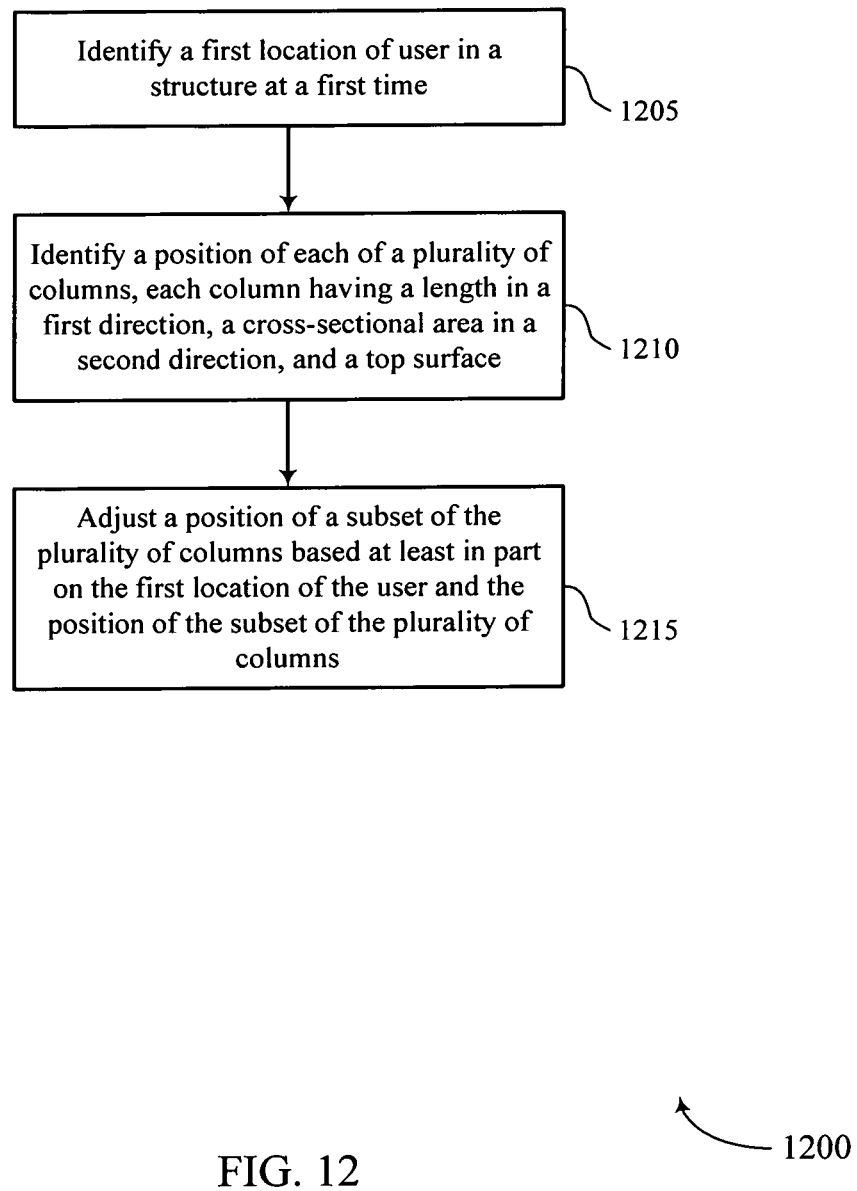
FIGS. 12 through 14 illustrate flowcharts for configuring an environment related to dynamic structure and surface environment in accordance with various aspects of the present disclosure.

FIG. 12 shows a flowchart illustrating a method 1200 for configuring an environment related to dynamic tessellated surface with individually oscillating tiles for virtual reality applications in accordance with various aspects of the present disclosure. The operations of method 1200 may be implemented by a dynamic surface controller 815 or its components as described herein. For example, the operations of method 1200 may be performed by a dynamic surface controller 815 as described with reference to FIGS. 8 through 10. In some examples, a dynamic surface controller 815 may execute a set of codes to control the functional elements of the device to perform the functions described below. Additionally or alternatively, the dynamic surface controller 815 may perform aspects the functions described below using special-purpose hardware.

At block 1205 the dynamic surface controller 815 may identify a first location of user in the structure at a first time. The operations of block 1205 may be performed according to the methods described with reference to FIGS. 8 through 10. In certain examples, aspects of the operations of block 1205 may be performed by a location component as described with reference to FIGS. 9 and 10.

At block 1210 the dynamic surface controller 815 may identify a position of each of a plurality of columns. In some examples, each column of the plurality may have a length in a first direction, a cross-sectional area in a second direction, and a top surface. The operations of block 1210 may be performed according to the methods described with reference to FIGS. 8 through 10. In certain examples, aspects of the operations of block 1210 may be performed by a position component as described with reference to FIGS. 9 and 10.

At block 1215 the dynamic surface controller 815 may adjust a position of a subset of the plurality of columns based on the first location of the user and the position of the subset of the plurality of columns. The operations of block 1215 may be performed according to the methods described with reference to FIGS. 8 through 10. In certain examples, aspects of the operations of block 1215 may be performed by an adjustment component as described with reference to FIGS. 9 and 10.

Figure 13:
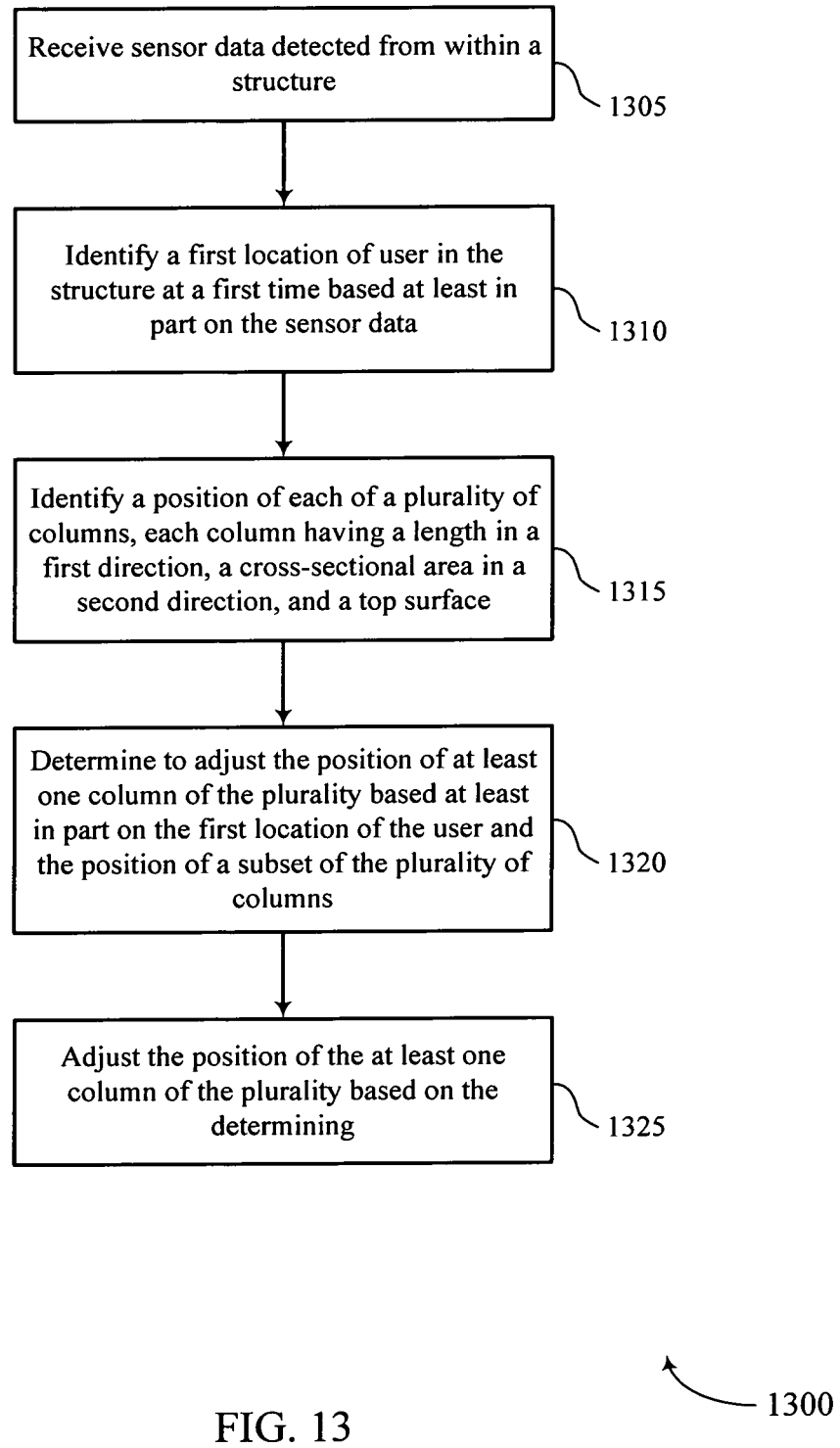

FIG. 13 shows a flowchart illustrating a method 1300 for configuring an environment related to dynamic tessellated surface with individually oscillating tiles for virtual reality applications in accordance with various aspects of the present disclosure. The operations of method 1300 may be implemented by a dynamic surface controller 815 or its components as described herein. For example, the operations of method 1300 may be performed by a dynamic surface controller 815 as described with reference to FIGS. 8 through 10. In some examples, a dynamic surface controller 815 may execute a set of codes to control the functional elements of the device to perform the functions described below. Additionally or alternatively, the dynamic surface controller 815 may perform aspects the functions described below using special-purpose hardware.

At block 1305 the dynamic surface controller 815 may receive sensor data detected from within a structure. In some examples, the structure may be associated with a virtual reality application. The operations of block 1305 may be performed according to the methods described with reference to FIGS. 8 through 10. In certain examples, aspects of the operations of block 1405 may be performed by a sensor component as described with reference to FIG. 10.

At block 1310 the dynamic surface controller 815 may identify a first location of user in the structure at a first time. The operations of block 1310 may be performed according to the methods described with reference to FIGS. 8 through 10. In certain examples, aspects of the operations of block 1310 may be performed by a location component as described with reference to FIGS. 9 and 10.

At block 1315 the dynamic surface controller 815 may identify a position of each of a plurality of columns. In some cases, each column may have a length in a first direction, a width in a second direction, and a top surface. The operations of block 1315 may be performed according to the methods described with reference to FIGS. 8 through 10. In certain examples, aspects of the operations of block 1315 may be performed by a position component as described with reference to FIGS. 9 and 10.

At block 1320 the dynamic surface controller 815 may determine to adjust the position of at least one column of the plurality based on the first location of the user and the position of a subset of the plurality of columns. The operations of block 1320 may be performed according to the methods described with reference to FIGS. 8 through 10. In certain examples, aspects of the operations of block 1320 may be performed by a position component or adjustment component as described with reference to FIGS. 9 and 10.

At block 1325 the dynamic surface controller 815 may adjust the position of the at least one column of the plurality based on the determining. The operations of block 1325 may be performed according to the methods described with reference to FIGS. 8 through 10. In certain examples, aspects of the operations of block 1325 may be performed by an adjustment component as described with reference to FIGS. 9 and 10.

Figure 14:
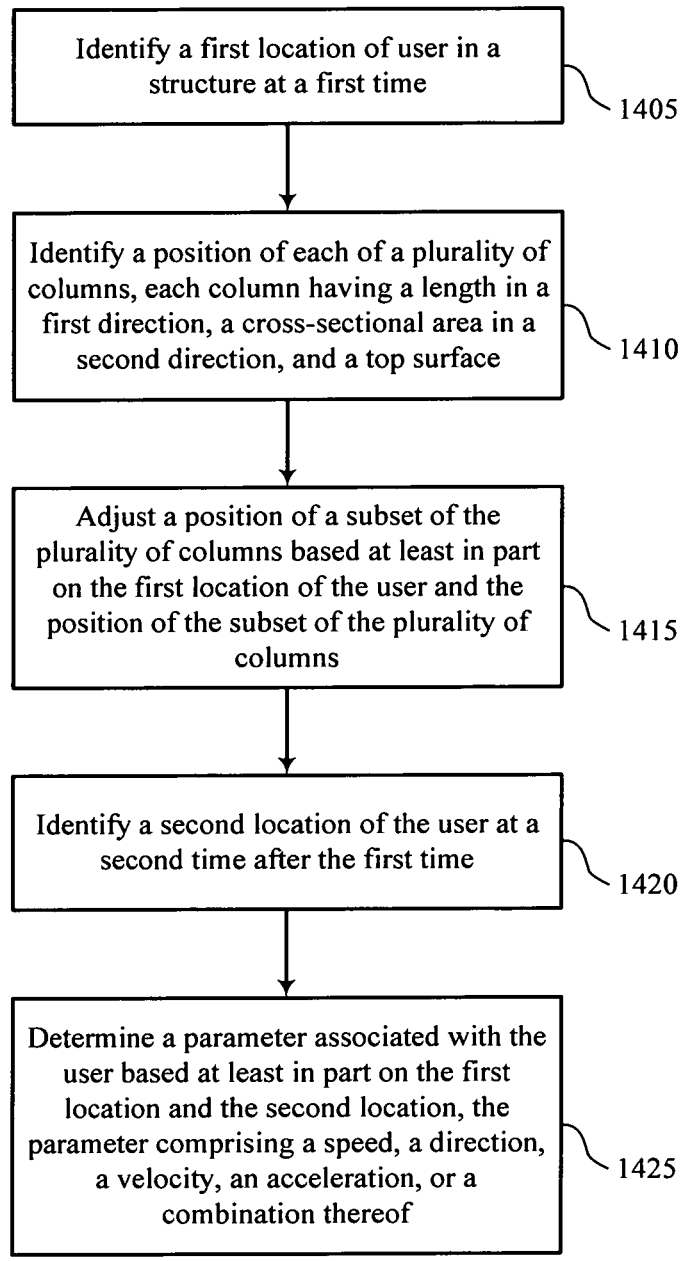

FIG. 14 shows a flowchart illustrating a method 1400 for configuring an environment related to dynamic tessellated surface with individually oscillating tiles for virtual reality applications in accordance with various aspects of the present disclosure. The operations of method 1400 may be implemented by a dynamic surface controller 815 or its components as described herein. For example, the operations of method 1400 may be performed by a dynamic surface controller 815 as described with reference to FIGS. 8 through 10. In some examples, a dynamic surface controller 815 may execute a set of codes to control the functional elements of the device to perform the functions described below. Additionally or alternatively, the dynamic surface controller 815 may perform aspects the functions described below using special-purpose hardware.

At block 1405 the dynamic surface controller 815 may identify a first location of user in a structure at a first time. The operations of block 1405 may be performed according to the methods described with reference to FIGS. 8 through 10. In certain examples, aspects of the operations of block 1405 may be performed by a location component as described with reference to FIGS. 9 and 10.

At block 1410 the dynamic surface controller 815 may identify a position of each of a plurality of columns. In some cases, each column may have a length in a first direction, a width in a second direction, and a top surface. The operations of block 1410 may be performed according to the methods described with reference to FIGS. 8 through 10. In certain examples, aspects of the operations of block 1410 may be performed by a position component as described with reference to FIGS. 9 and 10.

At block 1415 the dynamic surface controller 815 may adjust a position of a subset of the plurality of columns based on the first location of the user and the position of a subset of the plurality of columns. The operations of block 1415 may be performed according to the methods described with reference to FIGS. 8 through 10. In certain examples, aspects of the operations of block 1415 may be performed by an adjustment component as described with reference to FIGS. 9 and 10.

At block 1420 the dynamic surface controller 815 may identify a second location of the user at a second time. In some cases, the second time may be after the first time. The operations of block 1420 may be performed according to the methods described with reference to FIGS. 8 through 10. In certain examples, aspects of the operations of block 1420 may be performed by a location component as described with reference to FIGS. 9 and 10.

At block 1425 the dynamic surface controller 815 may determine a parameter associated with the user based on the first location and the second location. In some examples, the parameter may include a speed, a direction, a velocity, an acceleration, or a combination thereof. The operations of block 1425 may be performed according to the methods described with reference to FIGS. 8 through 10. In certain examples, aspects of the operations of block 1425 may be performed by a sensor component as described with reference to FIG. 10.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label may be used in the specification, the description may be applicable to any one of the similar components having the same first reference label irrespective of the second reference label.

Information and signals described herein may be represented using any of a variety of different technologies and techniques. For example, data, instructions, commands, information, and signals, that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be a processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that may be described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection may be properly termed a computer-readable medium. For example, if the software may be transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein may be provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for adjusting an environment, comprising:
   generating a physical topography within a structure using a plurality of columns, the structure comprising a physical room;
   identifying a first location of a user within the structure at a first time, wherein the user is physically within the structure;
   identifying a position of each of the plurality of columns within the structure, each column having a length in a first direction, a cross-sectional area in a second direction, and a top surface;
   identifying a second location of the user at a second time after the first time; and
   adjusting a position of a subset of the plurality of columns to change the generated physical topography within the structure and exert a response on the user based at least in part on the first location and the second location of the user within the structure and the position of the subset of the plurality of columns, the response comprising an inertial or gravitational effect.

2. The method of claim 1, further comprising:
   determining to adjust the position of at least one column based at least in part on the first location of the user and the position of the subset of the plurality of columns, wherein adjusting the position of the subset of the plurality of columns is based at least in part on the determination.

3. The method of claim 1, further comprising:
   receiving sensor data detected from within the structure, wherein identifying the first location of the user is based at least in part on the sensor data.

4. The method of claim 3, wherein the sensor data comprises data associated with a sensor in contact with a column of the plurality of columns, or data associated with a sensor isolated from the plurality of columns, or a combination thereof.

5. The method of claim 4, wherein the sensor data comprises video data, audio data, GPS data, or a combination thereof.

6. The method of claim 1, further comprising:
   determining a parameter associated with the user based at least in part on the first location and the second location, the parameter comprising a speed, a direction, a velocity, an acceleration, or a combination thereof, wherein adjusting the position of the subset of the plurality of columns is based at least in part on the determination.

7. The method of claim 1, wherein adjusting the position of the subset of the plurality of columns comprises:
   adjusting a first column to a first height in the first direction; and
   adjusting a second column to a second height different from the first height in the first direction, wherein adjusting the first column overlaps with adjusting the second column.

8. The method of claim 1, further comprising:
   identifying an action of the user relative to a column of the subset of the plurality of columns based at least in part on the first location of the user or sensor data, wherein adjusting the position of the column of the subset of the plurality of columns is based at least in part on the identification.

9. A columnar apparatus for an environment, comprising:
   a first plurality of columns having a length in a first direction, a first cross sectional area, a first subset of the first plurality of columns configured to adjust in the first direction from a first position to a second position;
   an actuator in contact with at least a portion of the first plurality of columns, the actuator configured to cause the portion of the first plurality of columns to adjust in the first direction from the first position to the second position based at least in part on a first location of a user at a first time, a second location of the user at a second time after the first time, and the first position of the subset of the plurality of columns; and
   a controller configured to receive information associated with position information of the first subset of the first plurality of columns and communicate with the actuator to change a physical topography in the environment using the first subset of the first plurality of columns and exert a response on the user based at least in part on the first location and the second location of the user within the structure, the response comprising an inertial or gravitational effect.

10. The columnar apparatus of claim 9, further comprising:
    a second plurality of columns extending in the first direction, wherein a second subset of the second plurality of columns is positioned below the first plurality of columns and is configured to adjust the first subset of the first plurality of columns in the first direction based at least in part on adjusting in the first direction.

11. The columnar apparatus of claim 10, wherein a second cross sectional area of the second subset of the second plurality of columns is greater than the first cross sectional area of a column in the first plurality of columns.

12. The columnar apparatus of claim 9, wherein the first subset of the first plurality of columns is configured to oscillate.

13. The columnar apparatus of claim 9, wherein a first column of the first plurality of columns comprises a first tile on a first end of the first column, wherein a second column of the first plurality of columns comprises a second tile on a first end of the second column, wherein a characteristic of the first tile is different from a characteristic of the second tile.

14. The columnar apparatus of claim 13, wherein the characteristic comprises: an orientation, a shape, a texture, a position relative to the first direction, or a combination thereof.

15. The columnar apparatus of claim 9, wherein the controller is configured to determine whether to communicate with the actuator based at least in part on the received position information associated with the user.

16. The columnar apparatus of claim 9, wherein the information associated with the position information comprises: virtual reality environment information, wherein the controller is configured to determine whether to communicate an instruction to the actuator to adjust the first subset of the first plurality of columns based at least in part on the virtual reality environment information.

* * * * *